United States Patent
Jackson et al.

(10) Patent No.: US 7,359,930 B2
(45) Date of Patent: Apr. 15, 2008

(54) SYSTEM AND METHOD FOR MANAGING COMPUTER NETWORKS

(75) Inventors: Eric S Jackson, Ann Arbor, MI (US); Douglas J Song, Ann Arbor, MI (US); Lawrence Benjamin Fleis, Lansing, MI (US); Aidan Christopher Dysart, Ann Arbor, MI (US); Gerald R Malan, Ann Arbor, MI (US)

(73) Assignee: Arbor Networks, Lexington, MA (US)

( * ) Notice: Subject to any disclaimer, the term of this patent is extended or adjusted under 35 U.S.C. 154(b) by 497 days.

(21) Appl. No.: 10/302,765

(22) Filed: Nov. 21, 2002

(65) Prior Publication Data

US 2004/0103211 A1    May 27, 2004

(51) Int. Cl.
G06F 15/173    (2006.01)
G06F 15/16    (2006.01)

(52) U.S. Cl. .............. 709/200; 709/223; 709/224; 709/225; 709/226; 709/244; 709/246

(58) Field of Classification Search ........ 709/223–226, 709/244, 246
See application file for complete search history.

(56) References Cited

U.S. PATENT DOCUMENTS

| | | | |
|---|---|---|---|
| 5,343,524 A | 8/1994 | Mu et al. | |
| 5,414,833 A | 5/1995 | Hershey et al. | |
| 5,437,244 A | 8/1995 | Van Gilst | |
| 5,490,252 A | 2/1996 | Macera et al. | |
| 5,541,854 A * | 7/1996 | Yundt .................. | 702/19 |
| 5,557,686 A | 9/1996 | Brown et al. | |
| 5,557,742 A | 9/1996 | Smaha et al. | |
| 5,606,668 A | 2/1997 | Shwed | |
| 5,621,889 A | 4/1997 | Lermuzeaux et al. | |
| 5,623,601 A | 4/1997 | Vu | |
| 5,796,942 A | 8/1998 | Esbensen | |
| 5,825,750 A | 10/1998 | Thompson | |
| 5,874,964 A | 2/1999 | Gille | |
| 5,884,282 A * | 3/1999 | Robinson .................. | 705/27 |
| 5,896,499 A | 4/1999 | McKelvey | |
| 5,944,823 A | 8/1999 | Jade et al. | |

(Continued)

FOREIGN PATENT DOCUMENTS

WO    WO 02/33895 A2    4/2002

(Continued)

OTHER PUBLICATIONS

Matthew V. Mahoney, Network Traffic Anomaly Detection Based on Packet Bytes, Florida Institute of Technology, Melbourne, Florida, Copyright 2003.

Primary Examiner—Nathan Flynn
Assistant Examiner—Joshua Joo
(74) Attorney, Agent, or Firm—Lowrie, Lando & Anastasi, LLP

(57) ABSTRACT

A system and method are provided for monitoring traffic in an enterprise network. Similar hosts may be grouped using flow information. Network policy may then be created at the group level based on the signatures of the hosts and groups of hosts in the enterprise. Hosts may be arranged in hierarchical clusters. Some of these clusters may be selected as groups based on a desired degree of similarity between hosts in a group. The similarity between hosts may be determined based on similarity of network behavior of the hosts.

6 Claims, 18 Drawing Sheets

U.S. PATENT DOCUMENTS

| | | |
|---|---|---|
| 5,970,227 A | 10/1999 | Dayan et al. |
| 5,991,881 A | 11/1999 | Conklin et al. |
| 6,105,063 A | 8/2000 | Hayes, Jr. |
| 6,119,236 A | 9/2000 | Shipley |
| 6,182,226 B1 | 1/2001 | Reid et al. |
| 6,223,175 B1 * | 4/2001 | George et al. .................. 707/6 |
| 6,271,845 B1 | 8/2001 | Richardson |
| 6,275,942 B1 | 8/2001 | Bernhard et al. |
| 6,321,338 B1 | 11/2001 | Porras et al. |
| 6,363,489 B1 | 3/2002 | Comay et al. |
| 6,453,345 B2 | 9/2002 | Trcka et al. |
| 6,480,840 B2 * | 11/2002 | Zhu et al. ....................... 707/3 |
| 6,502,131 B1 | 12/2002 | Vaid et al. |
| 6,628,654 B1 | 9/2003 | Albert et al. |
| 6,662,183 B2 * | 12/2003 | Beyer ........................... 707/10 |
| 6,732,149 B1 * | 5/2004 | Kephart ....................... 709/206 |
| 6,772,196 B1 * | 8/2004 | Kirsch et al. ............... 709/206 |
| 6,853,619 B1 | 2/2005 | Grenot |
| 6,891,839 B2 | 5/2005 | Albert et al. |
| 6,915,307 B1 * | 7/2005 | Mattis et al. ........... 707/103 R |
| 7,185,368 B2 | 2/2007 | Copeland, III |
| 2001/0044758 A1 * | 11/2001 | Talib et al. .................... 705/27 |
| 2002/0073338 A1 | 6/2002 | Burrows et al. |
| 2002/0103893 A1 * | 8/2002 | Frelechoux et al. ......... 709/223 |
| 2002/0104017 A1 | 8/2002 | Stefan |
| 2002/0107980 A1 * | 8/2002 | Kawaguchi .................. 709/238 |
| 2002/0133586 A1 | 9/2002 | Shanklin et al. |
| 2002/0164058 A1 * | 11/2002 | Aggarwal et al. ........... 382/125 |
| 2002/0169846 A1 * | 11/2002 | Chen et al. .................. 709/209 |
| 2003/0023711 A1 * | 1/2003 | Parmar et al. ............... 709/223 |
| 2003/0133443 A1 * | 7/2003 | Klinker et al. ............... 370/353 |
| 2003/0145041 A1 * | 7/2003 | Dunham et al. ............. 709/203 |
| 2004/0042470 A1 * | 3/2004 | Cooper et al. ............... 370/401 |
| 2004/0148382 A1 * | 7/2004 | Narad et al. ................. 709/223 |
| 2004/0187032 A1 | 9/2004 | Gels et al. |
| 2004/0199792 A1 * | 10/2004 | Tan et al. ..................... 713/201 |
| 2004/0237098 A1 | 11/2004 | Watson et al. |
| 2005/0251782 A1 * | 11/2005 | Rodrigues et al. .......... 717/100 |

FOREIGN PATENT DOCUMENTS

| | | |
|---|---|---|
| WO | WO 02/37755 A2 | 5/2002 |
| WO | WO 02/080458 A1 | 10/2002 |

* cited by examiner

SYSTEM AND METHOD FOR MANAGING COMPUTER NETWORKS

FIELD OF THE INVENTION

The present invention relates to computer networks, and more particularly to a system and method for monitoring and managing computer networks.

BACKGROUND OF THE INVENTION

Computer systems are often interconnected by computer networks for the purpose of communicating information. As used herein, a "computer network" or a "communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media. Computer systems connected on such networks communicate with each other by sending information through their interconnections, often using network communication devices such as routers, switches, bridges, and hubs.

Often business organizations maintain large computer networks. Such computer networks are sometimes referred to in the art as "enterprise" networks. Because of their size and complexity, enterprise networks may be difficult to manage. Techniques currently used to monitor and manage enterprise networks include the use of tools such as, for example, network management systems and the hardware and software they control (e.g., routers, hubs, switches, and the like), and special-purpose systems such as firewalls that manage access to networks to which a firewall is coupled.

Both firewalls and network management systems allow a network user to define policies. Historically, network management and other types of management systems have managed entities individually (e.g., by setting operating parameters of devices separately). However, managing each individual entity is expensive, time consuming, and error-prone. In addition, it is easy to implement settings on one device that are inconsistent with settings on the other devices. Policy-based management has improved and simplified manual configuration of devices by allowing an administrator to define a policy and apply a rule or other information to a group of entities. The term "policy" is a general term used to describe a rule or parameter which governs an entity (e.g., a device, user, application, server, etc.).

In the case of a firewall, a policy defines, for particular network devices, types of network accesses through the firewall that are authorized and types of network accesses that are unauthorized. This policy is often referred to as a "security" policy. As mentioned above, an administrator can define a policy for the access by external systems to the enterprise network and use a firewall and/or other network devices to enforce that policy.

Network administrators typically define a network policy as a need for that policy arises. This ad-hoc method is undesirable because policies are only created by a network administrator after a security violation has already occurred. Further, a great deal of time may elapse before the administrator realizes the problem exists and determines from where in the network the problem arises. Additionally, when determining an external access policy for a large enterprise network, a network administrator may have to customize the network policy for each device or group of devices in the network.

An enterprise network is sometimes separated from the Internet or other external networks by a communication system known in the art as a firewall. As discussed above, a firewall prevents unauthorized access to or from a computer network. Firewalls may be implemented, for example, in either hardware, software, or a combination thereof. Typically, a firewall performs some type of network traffic filtering based on an access policy defined on the firewall. Such filtering may be at the network protocol level, the packet level, or the application level.

A firewall allows a network administrator to control network accesses between the enterprise and the external network by determining a policy that controls such access. Such control may be useful in attempting to prevent malicious attacks on the enterprise. For example, an administrator may create security policies that may block the network traffic based on its source, network protocol, application protocol, or other characteristics. Likewise, a network administrator may wish to prevent hosts within the enterprise from unauthorized accesses outside the enterprise. For example, a network administrator may block certain hosts from accessing external World Wide Web (WWW) sites. Although firewalls allow a network administrator to control access between the enterprise and external networks, they typically do not allow the network administrator to monitor interactions between hosts and other network devices within the enterprise itself.

Network management systems exist that can autodiscover devices in a network based on their interconnections. Such systems are useful in entity management. That is, they allow a network administrator to determine the state of a particular network device (e.g., its connection status). However, because these systems are focused on individual network devices, they are not adapted to understanding network interaction within the enterprise as a whole.

Network management systems may also allow a network administrator to group network devices based on the physical distance between devices or based on the interconnections between devices and define policies for groups of network devices. These policies generally relate to the configuration of network communication devices and relate to how they communicate.

Some network management systems include a user interface that represents network devices as icons on the screen. Icons may be grouped together based on the distance between them on the screen. By using such groupings, a network administrator may avoid defining network policy for individual network devices by defining network policy for groups of network devices. However, as mentioned above, these groupings are often based on physical distances or interconnections between network devices. Thus, the policy defined for a group may not be equally applicable to all devices within the particular group. Because group policies are defined in an ad hoc manner, some may be incorrectly applied to one or more devices.

SUMMARY OF THE INVENTION

In one aspect of the invention, a method is provided for monitoring traffic in a computer network. The method comprising acts of receiving flow information related to network traffic a plurality of hosts in the computer network and determining similarity between the plurality of hosts in the computer network based on the flow information.

In one embodiment, the method of the present embodiment further comprises an act of creating network policy for the plurality of hosts in the network based on the flow information. The act of creating a network policy for the plurality of hosts may be performed automatically.

In another embodiment, the method comprises an act of arranging the plurality of hosts into a plurality of groups based on the similarity between the plurality of hosts. The act of arranging the plurality of hosts into a plurality of groups may be performed automatically. The method may further comprise an act of creating network policy for the plurality of groups of hosts based on the flow information. The act of creating network policy for the plurality of groups is performed automatically.

In another embodiment, the method comprises acts of arranging the hosts into hierarchical clusters and selecting at least some of the hierarchical clusters as groups.

In another aspect of the invention, a system for monitoring traffic in a computer network is provided. The system comprises at least one flow capture device configured to create flow information based on network traffic of a plurality of hosts in the computer network and a flow controller configured to determine similarity between the plurality of hosts in the computer network based on the flow information.

In one embodiment, the system comprises a network interface configured to receive data from the network and a packet analyzer and flow generation engine configured to receive network traffic from the network interface and generate flow information based on the network traffic. In another embodiment, the packet analyzer and flow generation engine may be implemented in hardware. In another embodiment, the packet analyzer and flow generation engine may also be implemented in software.

In another embodiment, the system further comprises an interface processor configured to provide an interface between a user and the packet analyzer and flow generation engine. The interface processor may be configured to provide the user with remote access to the packet analyzer and flow generation engine. The remote access may include world wide web (WWW) access. The remote access may also include simple network management protocol (SNMP) access.

In one embodiment, the packet analyzer and flow generation engine may be configured to export the flow information to the flow controller. In another embodiment, the flow controller comprises a network interface configured to receive data from the network and an aggregation engine configured to collect flows received from the at least one flow capture device. In another embodiment, the flow controller further comprises a database management system configured to store the flow received from the at least one flow capture device. The flow controller further comprises a signature generation engine configured to receive the flow information from the aggregation engine and generate signatures based on the flow information.

In one embodiment, the flow controller further comprises a grouping engine configured to receive the signatures from the signature generation engine and determine similarity between the plurality of hosts.

In another embodiment the system further comprises a policy management engine configured to create and manage network policy based on the similarity between the plurality of hosts determined by the policy management engine.

In yet another aspect of the invention a method of grouping a plurality of entities is provided. The method comprises acts of a) determining similarity values between pairs of the plurality of entities, b) arranging the plurality of entities into hierarchical clusters based on the similarity values, and c) selecting at least some of the hierarchical clusters as groups.

In one embodiment, the plurality of entities includes a plurality of hosts in a network and the act of determining similarity values further comprises an act of determining similarity between pairs of the plurality of hosts based on network behavior.

In another embodiment, the act b) further comprises acts of, b1) arranging each of the plurality of entities in a separate cluster and b2) merging the two most similar clusters into a single cluster. The method may further comprise an act of b3) repeating the act b2 until the plurality of entities are in a single cluster.

In one embodiment, the act c) further comprises an act of selecting at least some of the hierarchical clusters as groups based on a mean and a standard deviation of similarity values between the hierarchical clusters. In another embodiment, the act c) further comprises an act of selecting at least some of the hierarchical clusters as groups based on a desired degree of similarity between entities in a group.

In one embodiment, the method further comprises an act of d) applying a network policy to the plurality of hosts based on the groups.

In yet another aspect of the invention, a system configured to group a plurality of entities is provided. The system comprises a) means for determining similarity values between pairs of the plurality of entities, b) means for arranging the plurality of entities into hierarchical clusters based on the similarity values, and c) means for selecting at least some of the hierarchical clusters as groups.

In one embodiment, b) further comprises b1) means for arranging each of the plurality of entities in a separate clusters and b2) means for merging the two most similar clusters into a single cluster. In another embodiment, the system further comprises b3) means for merging the two most similar clusters until the plurality of entities are in a single cluster.

In one embodiment, the means for selecting further comprises means for selecting at least some of the hierarchical clusters as groups based on a mean and a standard deviation of similarity values between the hierarchical clusters.

In yet another aspect of the invention, a method of determining similarity between a first host and a second host based on the network behavior of the first and second hosts is provided. The method comprises acts of a) determining a first score based on the similarity between network traffic of top services using the first and host and network traffic of top services using the second host and b) determining a second score based on the total network traffic of the first host and the total network traffic of the second host.

In one embodiment, the method further comprises an act of c) combining the first and second scores to generate a similarity value. In another embodiment the act a) further comprises an act of determining the first score based on the similarity between network traffic of a top four of the top services using the first host and network traffic of a top four of the top services using the second host.

In one embodiment, the act b) further comprises an act of determining the second score based on a directionality and a magnitude of the total traffic of the first and second hosts. In another embodiment, the method further comprises acts of b1) representing the first host as a first point on a Cartesian plane based on the directionality and magnitude of the total traffic of the first host, b2) representing the second host as a second point on a Cartesian plane based on the directionality and magnitude of the total traffic of the second host, and b3) computing a Euclidean distance between the first and second points. In one embodiment, the method further comprises an act of combining the Euclidean distance and the first score to generate the similarity value.

In yet another aspect of the invention, a system configured to determine similarity between a first host and a second host based on network behavior of the first and second hosts is provided. The system comprises a) means for determining a first score based on the similarity between network traffic of top services using the first and host and network traffic of top services using the second host and b) means for determining a second score based on the total network traffic of the first host and the total network traffic of the second host.

In one embodiment, the system further comprises c) means for combining the first and second scores to generate a similarity value. In another embodiment, the means for determining a first score further comprises means for determining the first score based on the similarity between network traffic of a top four of the top services using the first host and network traffic of a top four of the top services using the second host.

In yet another embodiment, the means for determining the second score further comprises means for determining the second score based on a directionality and a magnitude of the total traffic of the first and second hosts.

In another embodiment, the system further comprises b1) means for representing the first host as a first point on a Cartesian plane based on the directionality and magnitude of the total traffic of the first host, b2) means for representing the second host as a second point on a Cartesian plane based on the directionality and magnitude of the total traffic of the second host, and b3) means for computing a Euclidean distance between the first and second points.

In another embodiment, the system further comprises means for combining the Euclidean distance and the first score to generate the similarity value.

In yet another aspect of the invention, a method is provided in a computer network having a plurality of hosts, a plurality of flow capture devices configured to capture a plurality of flows, and at least one flow controller for managing flow information received from the plurality of flow capture devices. The method comprises acts of a) identifying a flow from a first source, b) identifying a flow from a second source, c) determining if the flow from the first source is the same as the flow from the second source, and d) discarding the flow from the first source if it is the same as the flow from the second source.

In one embodiment, the act c) further comprises acts of computing a hash based on a first packet in each flow received by one of the plurality of flow capture devices and transmitting each flow and its corresponding hash to the flow controller.

In another embodiment, the method further comprises acts of maintaining a list of received hashes at the flow controller and comparing each hash received by the flow controller to the list of received hashes.

In another aspect of the invention, a computer-readable medium is provided that has computer-readable signals stored thereon that define instructions that, as a result of being executed by a computer, instruct the computer to perform a method of monitoring traffic in a computer network. The method comprises acts of receiving flow information related to network traffic a plurality of hosts in the computer network and determining similarity between the plurality of hosts in the computer network based on the flow information.

In yet another aspect of the invention, a computer-readable medium is provided that has computer-readable signals stored thereon that define instructions that, as a result of being executed by a computer, instruct the computer to perform a method of grouping a plurality of entities. The method comprises acts of a) determining similarity values between pairs of the plurality of entities, b) arranging the plurality of entities into hierarchical clusters based on the similarity values and c) selecting at least some of the hierarchical clusters as groups.

In yet another aspect of the invention, a computer-readable medium is provided that has computer-readable signals stored thereon that define instructions that, as a result of being executed by a computer, instruct the computer to perform a method of determining similarity between a first host and a second host based on the network behavior of the first and second hosts. The method comprises acts of a) determining a first score based on the similarity between network traffic of top services using the first and host and network traffic of top services using the second host and b) determining a second score based on the total network traffic of the first host and the total network traffic of the second host.

In yet another aspect of the invention, in a computer network having a plurality of hosts, a plurality of flow capture devices configured to capture a plurality of flows, and at least one flow controller for managing flow information received from the plurality of flow capture devices, a computer-readable medium is provided that has computer-readable signals stored thereon that define instructions that, as a result of being executed by a computer, instruct the computer to perform a method comprising acts of a) identifying a flow from a first source, b) identifying a flow from a second source, c) determining if the flow from the first source is the same as the flow from the second source, and d) discarding the flow from the first source if it is the same as the flow from the second source.

These and other aspect, objects, and features of the present invention will be better understood and appreciated from a reading of the following detailed description with reference to the accompanying drawings.

DETAILED DESCRIPTION

Figure 1:
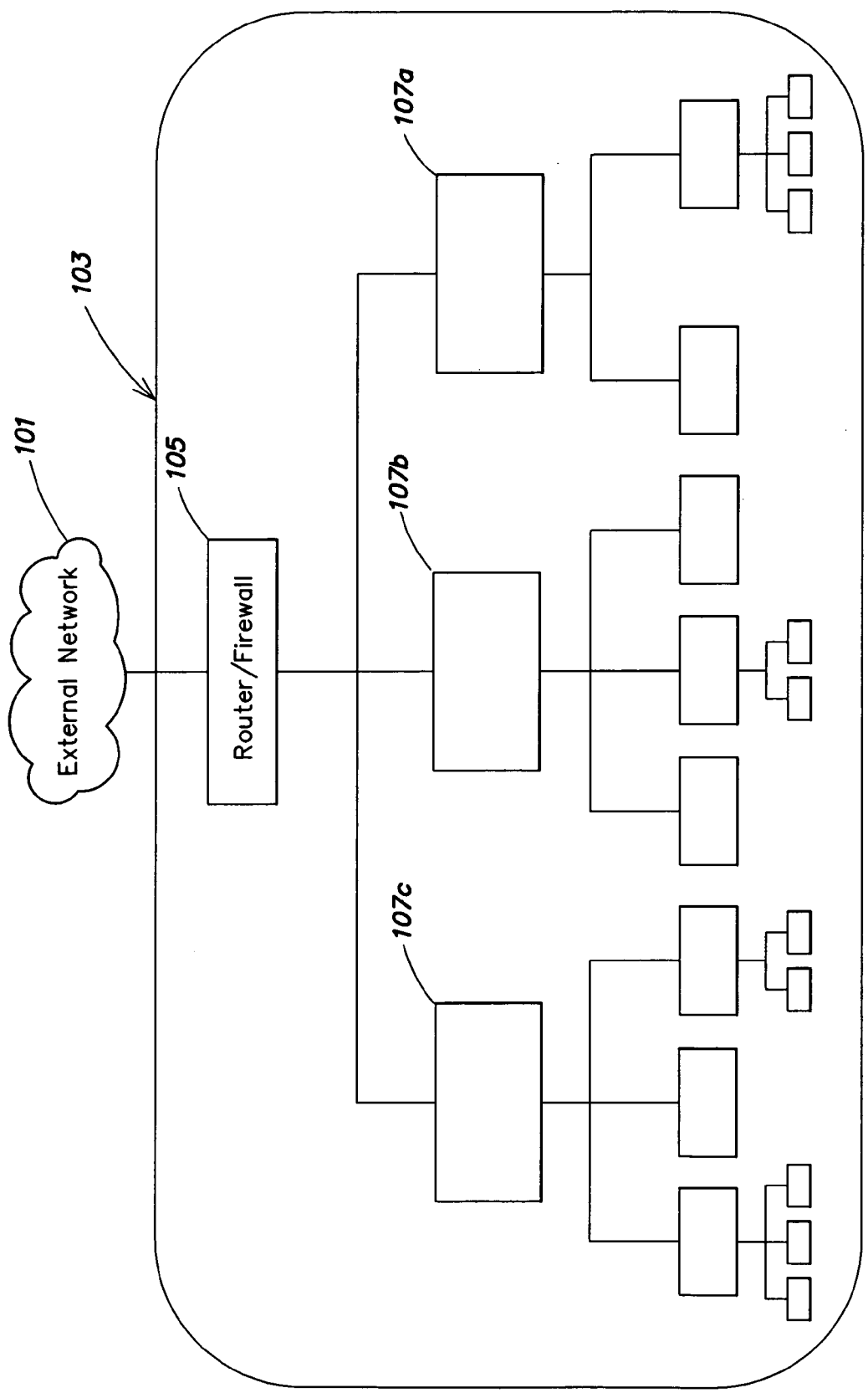
FIG. 1 illustrates an environment in which various embodiments of the invention may be used.

An example of an enterprise network is shown in FIG. 1. In FIG. 1, enterprise network 103 includes a plurality of network devices 107a, 107b, and 107c. Network devices 107a, 107b, and 107c may be any type of network devices, including host computers, client computers, server computers, routers, switches, bridges, hubs, and any other type of network device. The term "network device" as used herein is defined broadly as any network entity whose network accesses may be monitored.

Enterprise network 103 is separated from external network 101 by a firewall 105. External network 101 may be any network external to enterprise network, including the Internet, or any other enterprise network, local area network (LAN), or wide area network (WAN). Firewall 105 may also perform routing functions to route network traffic to particular network devices 107 as it is received from external network 101 and to route network traffic exiting enterprise network 103 to external network 101. Firewall 105 may be a single device that acts as both a router and a firewall, or may be separate devices with one performing operations related to traffic filtering and another performing operations related to traffic routing.

Flow Collection

In one embodiment of the present invention, network traffic of hosts in an enterprise may be evaluated by collecting and analyzing flows. A flow, as used herein, is a unidirectional sequence of packets traveling between a source and a destination within a certain period of time. Flow information is used to represent the flow and is used to perform various aspects of network management, including network traffic accounting, usage-based network billing, network planning, Denial of Service (DoS) monitoring, and network monitoring.

Representing flows of flow information and using such flow information is well-known and is performed by a variety of commercial systems. For example, network devices such as Cisco routers available from Cisco Systems, Inc. can collect flow data (referred to in the art as NetFlow data) and export such data to systems that use such data for various functions. Other flow collection methods and information may be used (e.g., router devices available from Juniper Networks), and the invention is not limited to any particular flow collection method or information.

Information contained in a flow may depend on the network protocol (i.e., Layer 3 protocol) used. In one embodiment of the invention, TCP/IP is used as the network protocol. When using TCP/IP as the network protocol, each packet in the flow has the same source IP address, destination IP address, source port (e.g., udp/tcp source port), destination port (e.g., udp/tcp destination port), and transport protocol. Other information may be included in the flow, such as the next hop router's IP address, input and output interface's SNMP index, the number of packets in the flow, the total number of layer 3 bytes in the flow's packets, the system time at the start of a flow, and the system time at the time the last packet of flow was received. It should be appreciated that any information related that the information included in a flow may be used and the flow information is not limited to the examples listed above. Indeed, a flow may include any information related to the packets included in the flow.

Further, it should be appreciated that many other network protocols, such as, for example, point-to-point protocol (PPP), IPX, and Appletalk protocol could be used, as the invention is not limited in this respect. It should also be understood that the information included in a flow may vary depending on the network protocol used.

Defining network traffic in terms of flows allows one to gain a broad understanding of communications between hosts in the enterprise. Current network management tools, which are focused on providing status information about individual entities in a network, make it difficult to define policies and create alerts based on violations of the policies. Typically, a network administrator creates policies without a true understanding of network traffic. However, by observing flows, one may gain an understanding of network traffic as a whole. Such an understanding aids in creating network policy.

Figure 2:
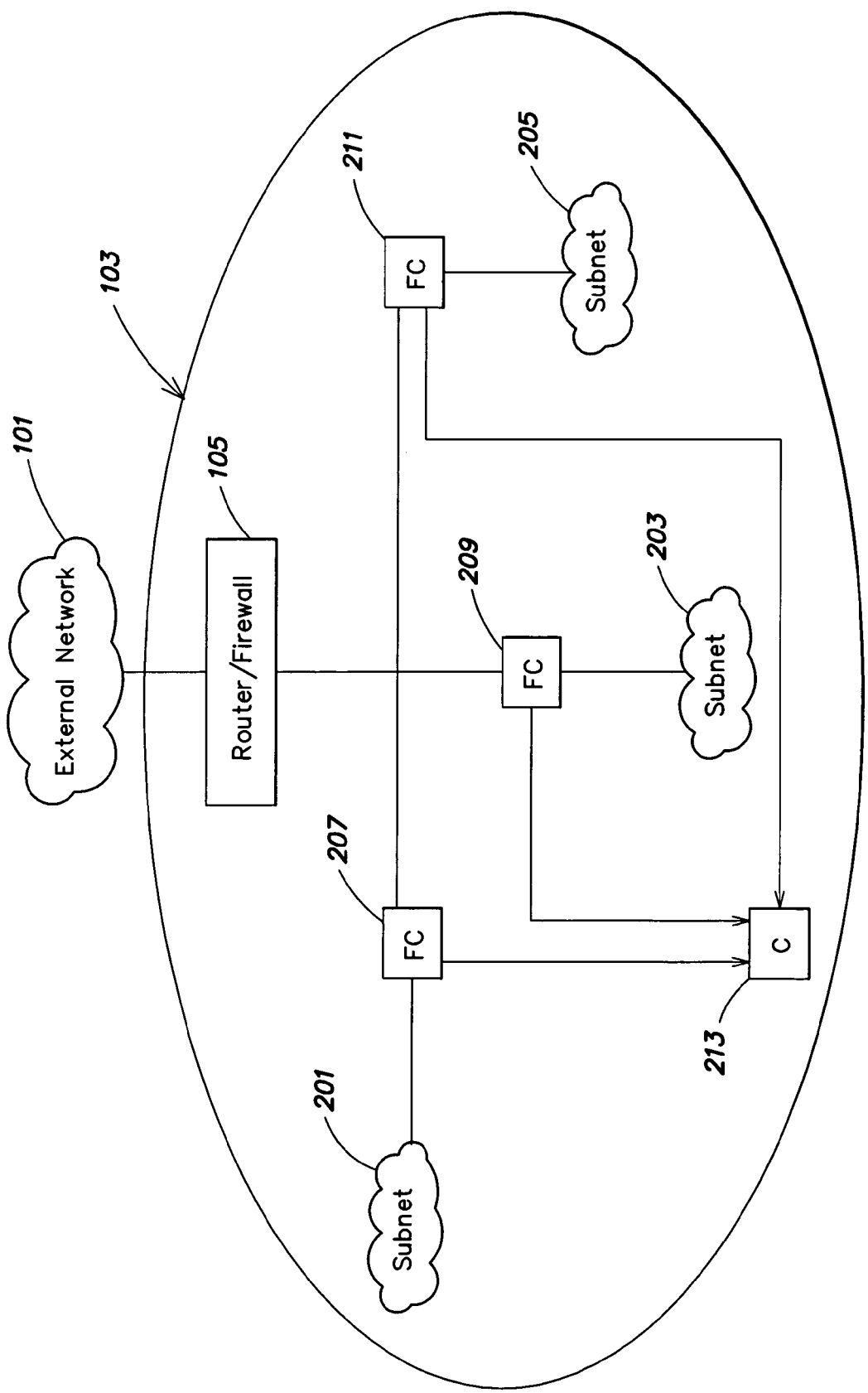
FIG. 2 illustrates a deployment of flow capture devices within an enterprise network according to one embodiment of the invention.

To gain a broad understanding of network traffic within the enterprise, it may be desirable to observe flows and collect flow information. FIG. 2 illustrates an enterprise network in which flow information is collected according to one embodiment of the invention. Enterprise network 103 is connected to external network 101 though router/firewall 105. External network 101 may be any network external to enterprise network 103. As mentioned above, in addition to performing network traffic filtering operations, router/firewall 105 may perform routing functions to route network traffic to particular network devices as it is received from external network 101, to route network traffic exiting enterprise network 103 to external network 101, and to intra-enterprise network traffic. Router/firewall 105 may be a single device that acts as both a router and a firewall, or may be separate devices one performing operations related to traffic filtering and another performing operations related to traffic routing.

Flow capture devices 207, 209, and 211 are located outside their respective subnets 201, 203, and 205. By positioning the flow capture devices in this manner, the flow capture devices may collect flow information relating to inter-subnet traffic or subnet to external network traffic. For example, flow capture device 207 may collect flow information relating to network traffic transmitted between external network 101 and subnet 201, traffic transmitted between subnet 201 and subnet 203, and traffic transmitted between subnet 201 and 205. Likewise, flow capture device 209 may collect flow information relating to network traffic between external network 101 and subnet 203, traffic transmitted between subnet 203 and subnet 201, and traffic transmitted between subnet 203 and subnet 205. Similarly, flow capture device 211 may collect flow information related to network traffic transmitted between subnet 205 and External network 101, traffic transmitted between subnet 205 and subnet 201, and traffic transmitted between subnet 205 and 203.

It should be appreciated that for traffic transmitted to or from a subnet, flow capture devices 207, 209, and 211 may report the captured network traffic to flow controller 213. Flow controller 213 may accumulate the flow information and generate signatures for each host or group of hosts in the network that describe their communication behavior. The generation of signatures will be discussed below in greater detail.

As mentioned above, a flow capture device may be any device that can receive raw packet information and export the collected raw packet information. The flow capture device may also be capable of summarizing the raw packet information into flows. Alternatively, this function may be performed at the flow controller. The flow capture device may be a router, switch, a dedicated flow capture device, or any other device or system that collects flow information. The flow capture device and flow controller may also be systems that execute software stored on a computer-readable medium (e.g., disk, tape, memory, or other data storage medium) that is executed by a host (e.g., a general-purpose computer system) or other network system or device. Examples of routers that are capable of exporting flow information include Cisco NetFlow capable routers, sold by Cisco Systems, Inc., having headquarters in San Jose, Calif. It should further be appreciated that the flow capture devices may connect to the flow controller using either a dedicated connection or the existing network infrastructure.

FIG. 2 shows three subnets in enterprise network 103. This number is given only as an example. It should be appreciated that an enterprise network may contain any number of subnets as the invention is not limited in this respect.

Figure 3:
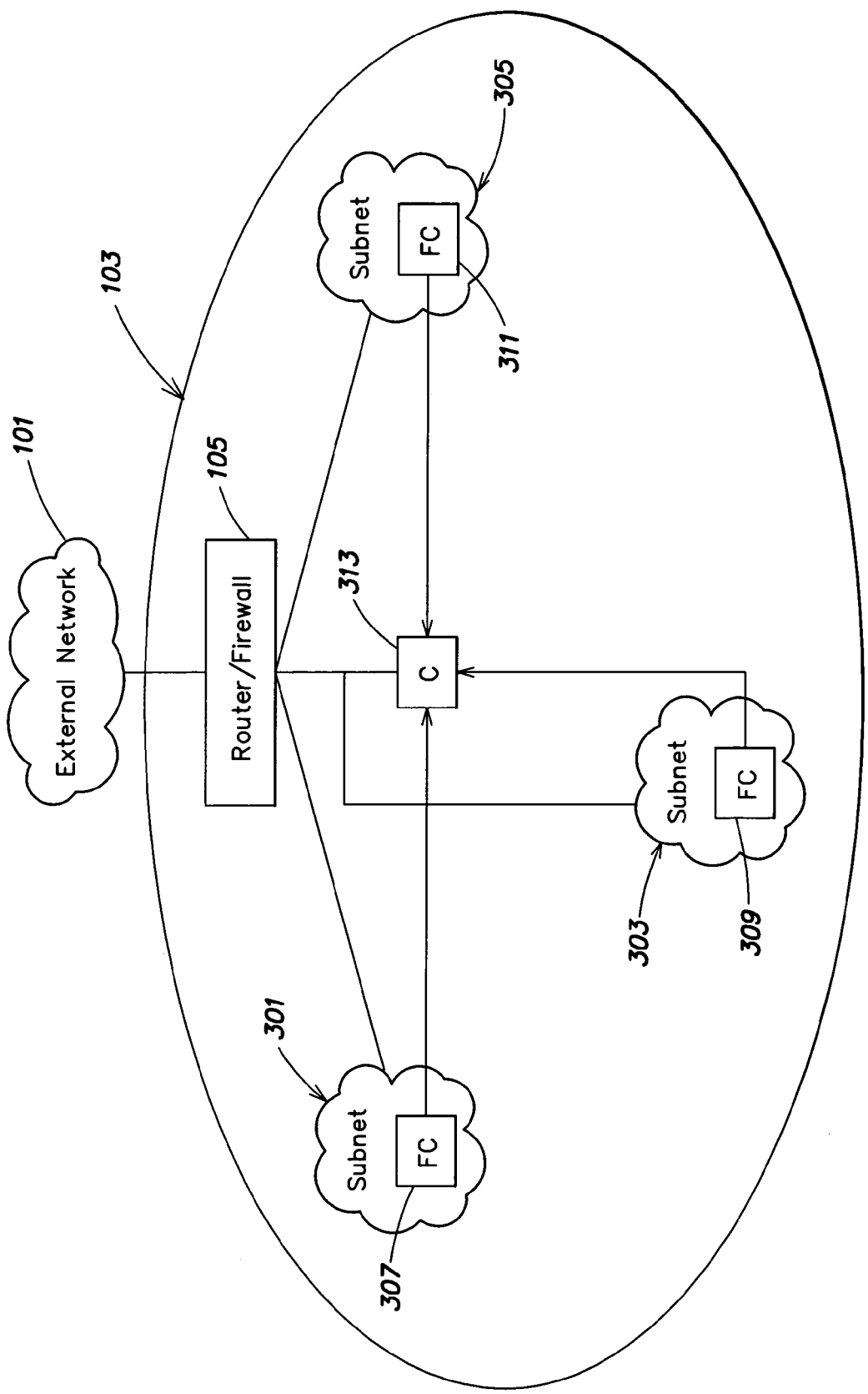
FIG. 3 illustrates a deployment of flow capture devices within an enterprise network according to another embodiment of the invention.

FIG. 3 illustrates another way in which flow capture devices may be deployed in an enterprise network according to one embodiment of the invention. Similar to the deployment shown in FIG. 2, enterprise network 103 is connected to external network 101 through router/firewall 105. However, in this embodiment, flow capture devices 307, 309, and 311 are located within their respective subnets 301, 303, and 305. Flow capture devices may export captured information to flow controller 313. In such a deployment, the flow capture devices can collect intra-subnet flow information, as well as information for flows between subnets and information for flows between a subnet and external network 101.

For example, flow capture device 307 can capture network traffic between hosts in subnet 301, traffic between subnet 301 and external network 101, traffic between subnet 301 and subnet 303, and traffic between subnet 301 and subnet 305. Likewise, flow capture device 309 can capture network traffic between hosts in subnet 303, traffic between subnet 303 and external network 101, traffic between subnet 303 and subnet 301 and traffic between subnet 303 and subnet 305. Similarly, flow capture device 311 can capture network traffic between hosts in subnet 305, traffic between subnet 305 and external network 101, traffic between subnet 305 and subnet 301 and traffic between subnet 305 and subnet 303. Although three subnets are shown as part of enterprise network 103 in FIG. 3, it should be understood that any number of subnets and flow capture devices may be used, as the invention is not limited in this respect.

Figure 4:
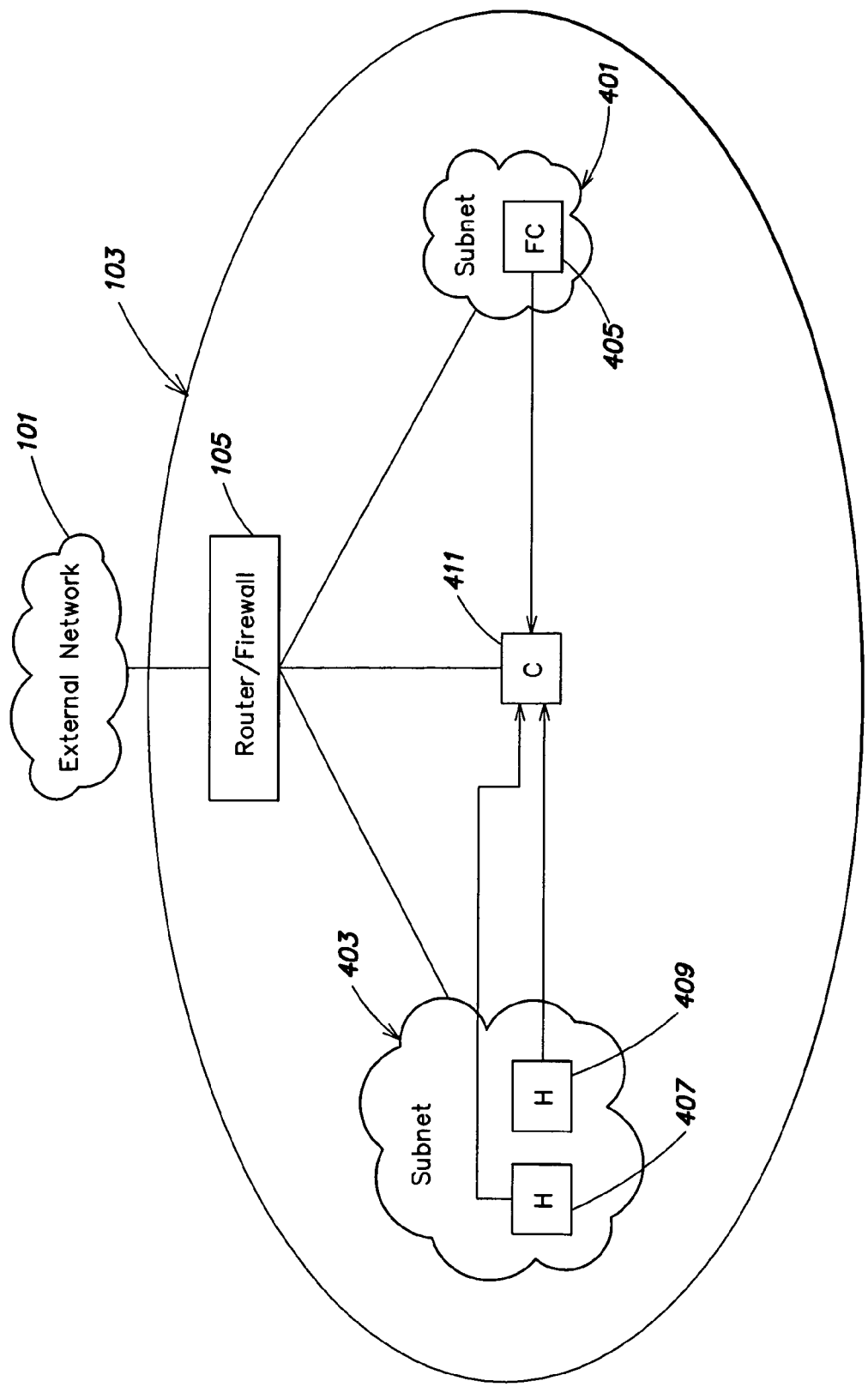
FIG. 4 illustrates a deployment of flow capture devices within an enterprise network according to yet another embodiment of the invention.

FIG. 4 illustrates yet another way of collecting flow information in an enterprise network. Similar to FIGS. 2 and 3, enterprise network 103 in FIG. 4 is connected to external network 101 though router/firewall 105. Also, as in FIG. 3, flow capture device 405 is positioned within subnet 401, allowing for capture of traffic between hosts in subnet 401, between subnet 401 and subnet 403 and between subnet 401 and external network 101. However, in subnet 403, hosts 407 and 409 act as flow capture devices. That is, for example, host 407 exports traffic information between itself and other hosts in subnet 403, between itself and external network 101 and between itself and subnet 401. Thus, in such a deployment, a separate flow capture device is not needed.

Figure 18:
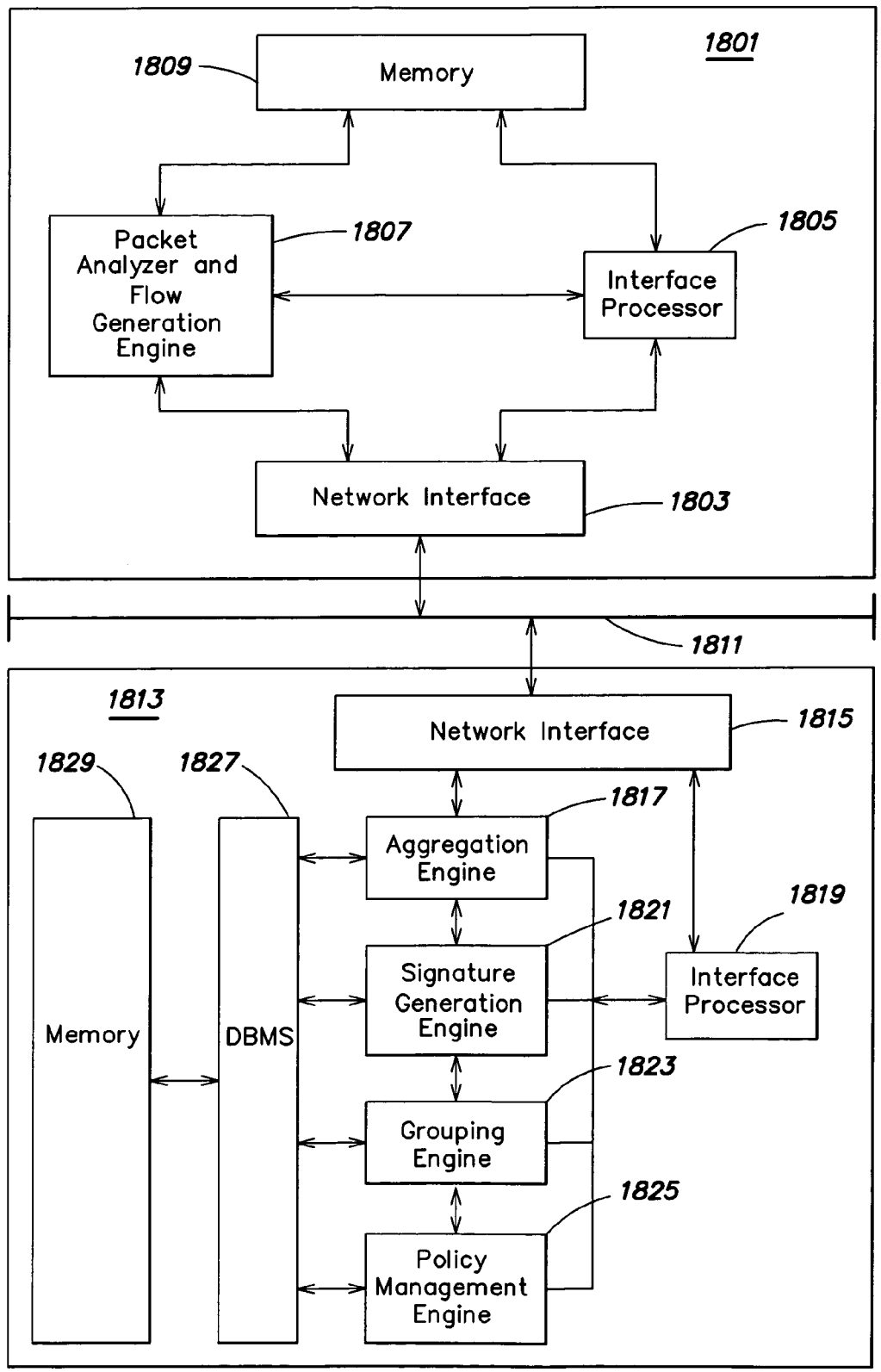
FIG. 18 is a block diagram of an example of a flow culture device and flow controller according to one embodiment of the invention.

FIG. 18 is a block diagram illustrating a flow capture device 1801 and a flow controller 1813 according to various embodiments of the invention. Flow capture device 1801 may export flow information to flow controller 1813 over network connection 1811. It should be appreciated that network connection 1811 may be a dedicated network connection between flow capture device 1801 and flow controller 1813 or may simply be the existing network infrastructure of the enterprise network.

In one embodiment of the invention, flow capture device 1801 includes a network interface 1803, a packet analyzer and flow generation engine 1807, an interface processor 1808, and the memory 1809. Network interface 1803 may receive raw packet information from network connection 1811 and transmit the raw packet information to packet analyzer and flow generation engine 1807. It should be appreciated that packet analyzer and flow generation engine may be implemented in either hardware, software, or a combination thereof. For example, packet analyzer and flow generation engine 1807 may be a process or a multiple processes running on a processor. Packet analyzer and flow generation engine 1807 may receive packets from the interface and create flow records from the information in the packets. Flow information may be stored in memory 1809. Packet analyzer and flow generation engine 1807 may also export the flow information to flow controller 1813.

According to one embodiment of the invention, packet analyzer and flow generation engine 1807 may also collapse two related flows into a single flow. For example, file transfer protocol (FTP) uses two separate connections. One connection is a control connection between the client and the server for transferring commands and configuration information while the other is a data connection for transferring data. Packet analyzer and flow generation engine may collapse two connections into a single flow so that the information is easier to understand when viewed by a network administrator. Conventional flow data (e.g., NetFlow data) does not include information that allows such a collapsing of flow information into a single flow.

Interface processor 1805 provides an interface between packet analyzer and flow generation engine 1807 and a user. Thus, a user is able to configure packet analyzer and flow generation engine 1807. Interface processor 1805 may allow for a remote connection by a user (e.g., an HTTP connection or a SNMP connection) or may simply allow a user to configure packet analyzer and flow generation engine 1807 locally.

In one embodiment of the invention, flow controller 1813 includes a network interface 1815, an aggregation engine 1817, a signature generation engine 1821, a grouping engine 1823, a policy management engine 1825, an interface processor 1819 and a memory 1829. Flow collector 1813 may optionally include a database management system (DBMS) 1827 that provides for efficient access to memory 1829. Network interface 1815 receives information from network connection 1811 and provides that information to aggregation engine 1817 or interface processor 1819. Aggregation engine 1817 aggregates flow information received from the flow capture devices in the network. Signature generation engine 1821 processes this flow information to generate signatures for the host. Signature generation will be discussed further below in greater detail. Grouping engine 1823 determines similarity between hosts and the network and may arrange these hosts into groups. Policy management engine 1825 may be used to edit and manage network policy using signatures and groupings of hosts.

Flow information, signatures, and policies may be stored in memory 1829. DBMS 1827 may optionally be used to provide efficient access to memory 1829. The memory may include flow collector 1813 may also include an interface processor 1819 which operates similar to the interface processor of flow capture device 1801 and which provides access to a user for configuring the engines of flow collector device 1813.

It should be appreciated that the structure of flow capture device 1801 and flow collector 1813 illustrated in FIG. 18 are only given as examples. Many other implementations of these devices could be used as the invention is not limited in this respect. It should further be appreciated that each of the blocks illustrated in FIG. 18 may be implemented in either hardware, software, or a combination thereof.

It should be appreciated that the deployment schemes illustrated in FIGS. 2-4 are provided only as examples and many other deployment schemes may be used as the invention is not limited to any particular deployment scheme. For example, some flow capture devices in an enterprise may be positioned inside a subnet, while other flow capture devices in the enterprise may be positioned outside a subnet. Additionally, some hosts may export traffic information. Moreover, it should be appreciated that while a single flow controller is shown in each of FIGS. 2-4, multiple flow controllers working in parallel could be used (e.g., for redundancy).

Signature Generation

Once flow information has been collected, the flow information may be processed to generate signatures that describe network behavior of hosts or groups of hosts as well as network policy for those hosts or groups of hosts. By generating signatures for a group of hosts, a signature does not need to be associated redundantly with each individual host. Thus, the amount of processing performed on each flow which matches the network behavior of that particular group may be reduced, and the amount of storage required for storing signatures may be reduced. Further, the number of signatures which an operator may use when analyzing network policy may be reduced. However, it should be understood that a signature that is unique to a host may be associated with that host and not the entire group of that host. Hosts that are grouped together, because they have similar network behavior, may share a common or similar network policy.

Figure 5:
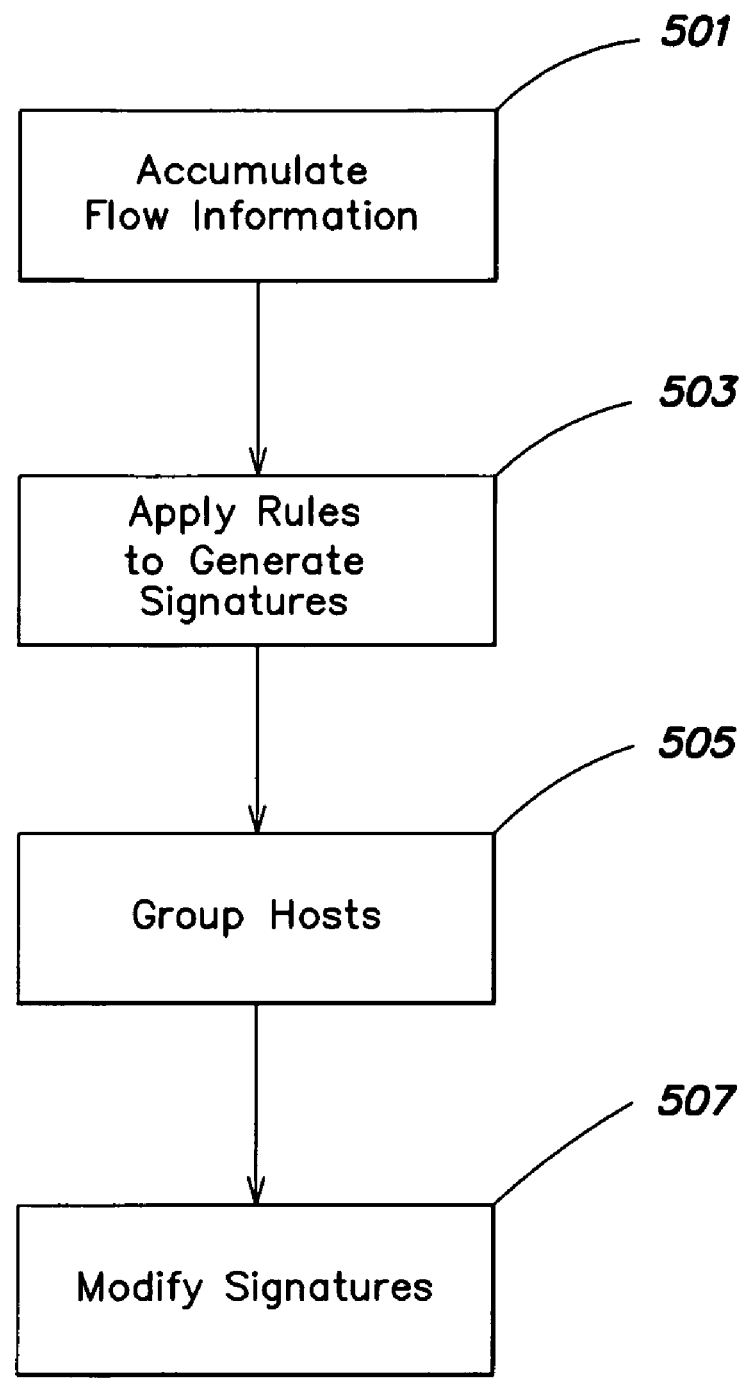
FIG. 5 is a flow chart illustrating a process for creating a network policy according to one embodiment of the invention.

FIG. 5 illustrates a method for creating a policy for the enterprise network using signatures. At step 501, flow information is accumulated using, for example, flow capture devices and flow controllers, as described above. At step 503, signatures may be generated by applying rules to the flow information. Generally, a signature describes standard network behavior for a given host or group of hosts in the network. In one embodiment of the invention, only a portion of the flow information is used to generate a signature. As mentioned above, a TCP/IP flow may include the source IP address, destination IP address, source port (e.g., udp/tcp source port), destination port (e.g., udp/tcp destination port), transport protocol, the next hop router's IP address, input and output interface's SNMP index, the number of packets in the flow, the total number of Layer 3 bytes in the flow's packets, the system time at the start of a flow, and the system time at the time the last packet of flow was received.

Figure 6:
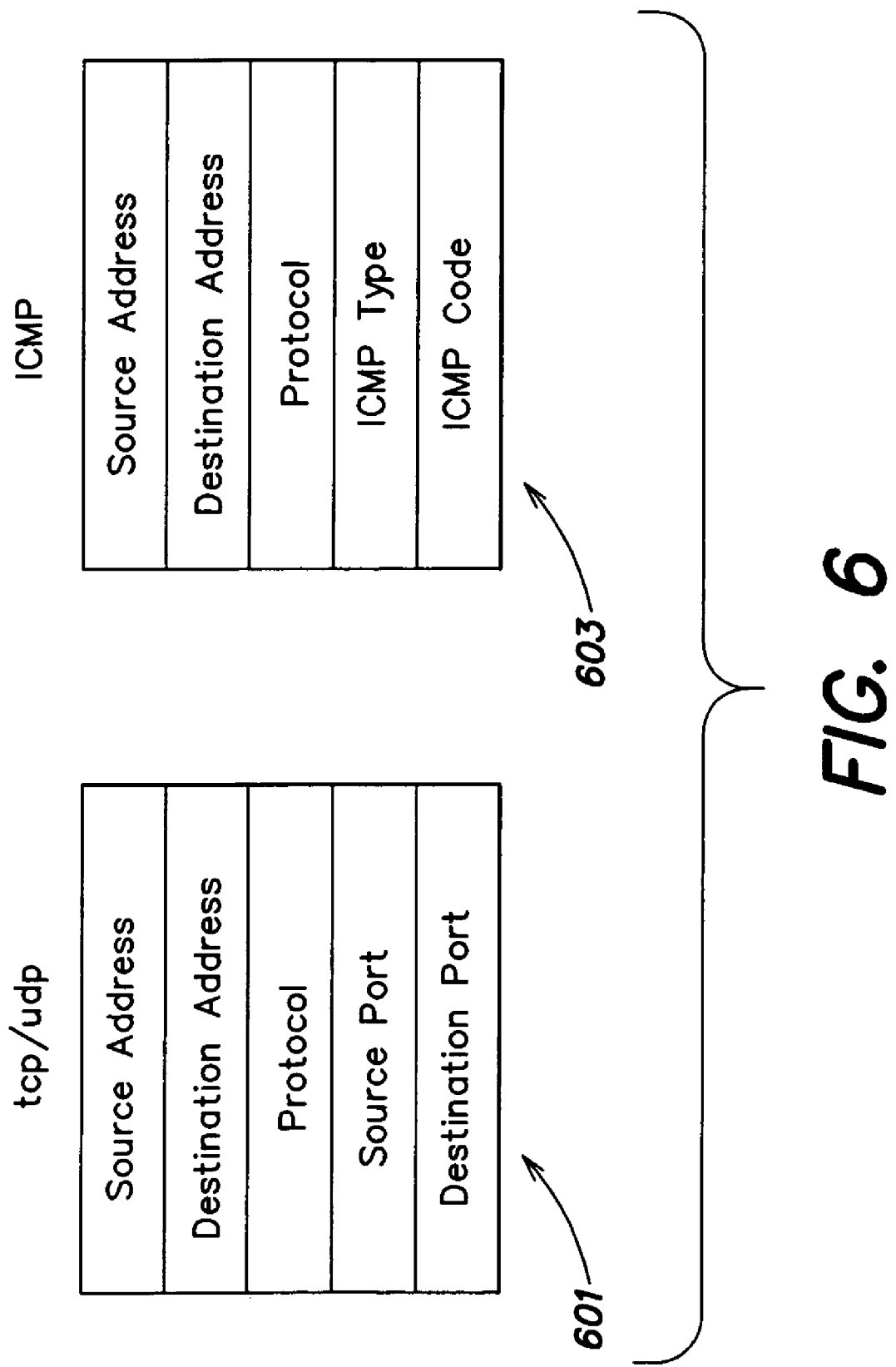
FIG. 6 is a diagram illustrating an example of flow information used in generating a signature according to one embodiment of the invention.

However, according to one embodiment of the invention, as shown in FIG. 6, a signature includes only a subset of the flow information. For example, as shown in FIG. 6, a signature 601 for transmission control protocol (tcp) and universal datagram protocol flow (udp), includes source address, destination address, protocol (e.g., transport layer protocol), source port, and destination port. A signature 603 for an Internet Control Message Protocol (ICMP) flow substitutes the ICMP type and ICMP code for the source port and destination port of a tcp or udp signature.

It should be appreciated that the information included in a signature, as shown in FIG. 6, is provided only as an example, as the invention is not limited in this respect. For example, other information from a flow could be included in the signature, such as the number of packets in the flow or the next hop router's IP address. Indeed, any information which helps classify a host's network behavior may be included.

Figure 7:
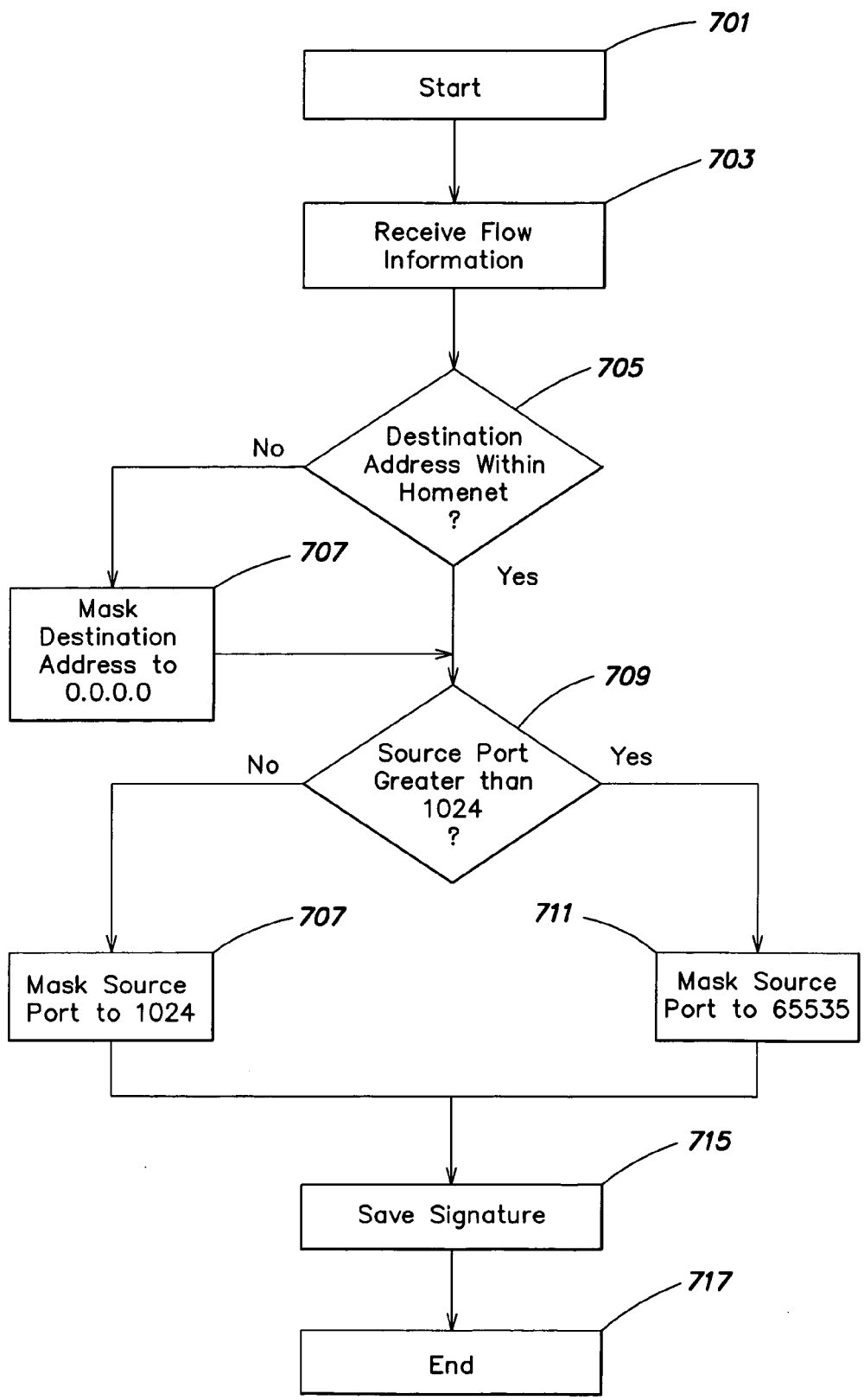
FIG. 7 is a flow chart illustrating a process for generating signatures based on flow information according to one embodiment of the invention.

As mentioned above, a signature may be generated by applying to rules to the subset of flow information. An example of a process of applying rules to the flow information is shown in FIG. 7. At step 701 the process begins. At step 703, flow information for a particular flow is received. The flow information may include only the subset of flow information that will be used in the signature or may include all of the flow information captured in the flow. If the flow information includes all of the information in the flow, the process may include an additional step of discarding the flow information that is not included in the signature.

At step 705, it is determined whether the destination address of the flow is within the homenet. A homenet is defined broadly as the range of addresses that are allocated for use within the enterprise network. A destination address that is not within the homenet indicates that the destination of the flow is outside of the enterprise network. If the destination address is not within the homenet, it may be masked to 0.0.0.0., as shown at step 707. Because it is desired to observe the behavior of hosts within the network, it may not be necessary to track addresses of external hosts. It may be sufficient to note that a connection is external without specifying the particular address of the connection.

The process proceeds to step 709 where it is determined if the source port of the flow is greater than 1024. If the source port is greater than 1024, it is masked to 65535 at step 711. Such a rule is useful, for example, in indicating that a flow is WWW traffic from a random port to an external host. If the source port is less than 1024, the source port is masked to 1024 at step 713. Source ports less than or equal to 1024 are typically reserved for privileged services or daemons. In the case of ICMP it should be appreciated that ICMP flows do not specify a source port and destination port. Instead, ICMP flows include an ICMP type and code. Although the same rules for destination addresses are applied to ICMP flows, the ICMP type and code are not modified. At step 715, the signature is saved and the process ends at step 717.

Figure 8:
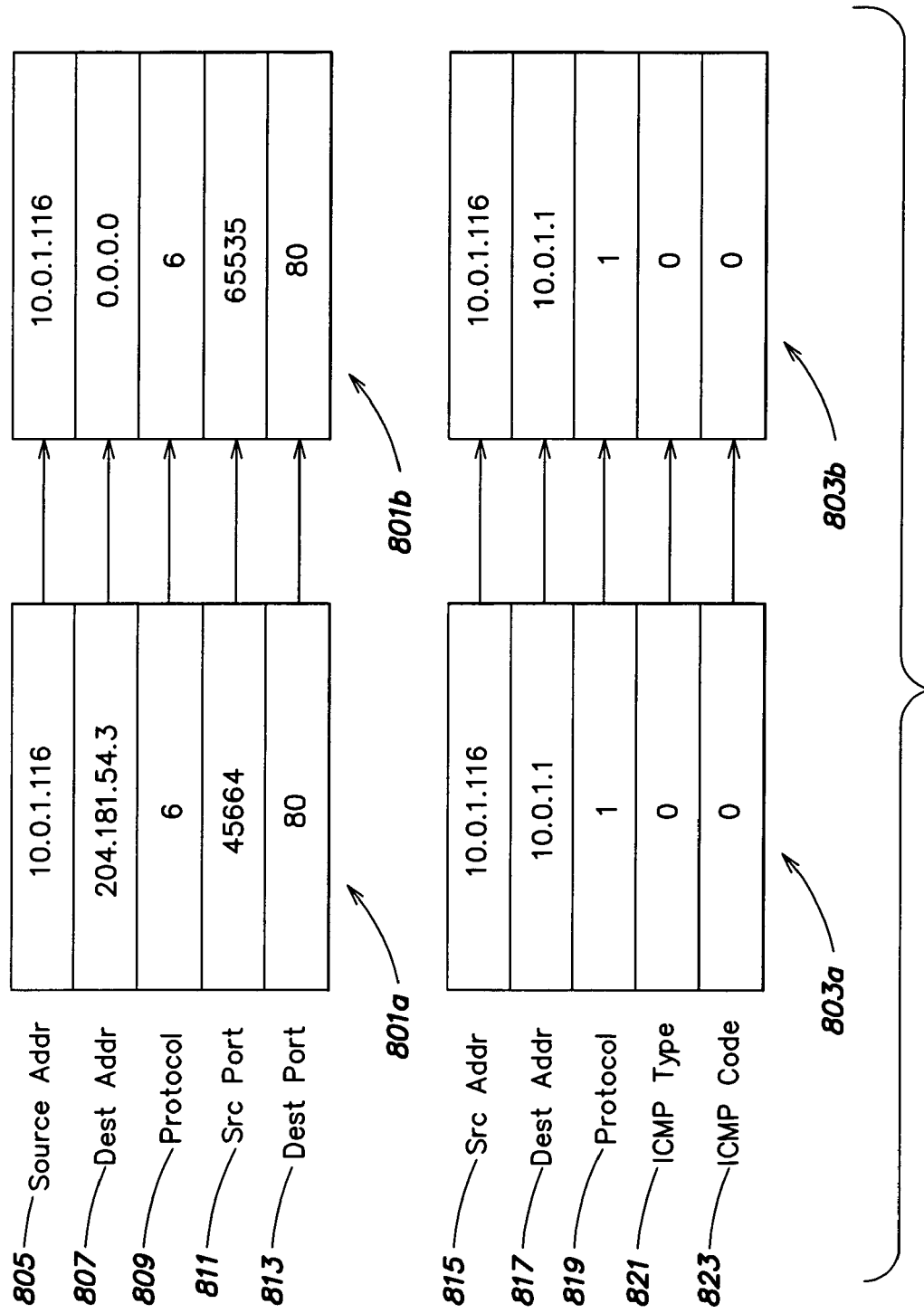
FIG. 8 is a diagram illustrating generation of signatures from flow information according to one embodiment of the invention.

FIG. 8 shows an example of generating signatures from flow information according to the signature generation process discussed above with respect to FIG. 7. In this example, the homenet is 10.0.0.0/8. In a first example, flow information 801*a* includes a source address 805, a destination address 807, a protocol 809, a source port 811, and a destination port 813. Because the value of the protocol field 809 is six, the flow is identified as a tcp flow. Destination address 809 is outside of the homenet, and is therefore masked to 0.0.0.0 in signature 801*b*. Further, the source port is 45664, indicating a random port. Consequently, it is masked to 65535 in signature 801*b*. In a second example, flow information 803*a* for an ICMP flow is shown. The value of the protocol field 819 indicates that flow information 803*a* pertains to an ICMP flow. The destination address 817 is within the homenet and is therefore not masked in signature 803*b*. As mentioned above, the ICMP type 821 and ICMP code 823 are not modified.

It should be appreciated that rules for generating a signature discussed above in relation to FIGS. 7 and 8 are given only as examples. The rules may vary depending on what information is included in a signature and how the hosts are to be grouped. Many other rules could be used depending on the desired characteristics of a group of hosts. For example, if it is desired that the transport layer protocol is unimportant in distinguishing the network behavior of hosts, the protocol field could also be masked. It should further be appreciated that although the above examples are given in the context of TCP/IP as the network protocol, many other network (i.e., Layer 3) protocols or other types of protocols could be used, as the invention is not limited in this respect. It also should be understood that the information contained in a flow and a signature may vary depending on the network protocol being used. However, the exact information included in a flow or signature is unimportant as long as at least some of the information in a flow or signature can be used to describe a host's network behavior.

Double Counting

Because signatures may be used in determining similarity of network behavior of the hosts and determining network policy for the hosts, it is desirable that the information from which signatures are generated (e.g., flow information) be accurate. The accuracy of flow information collected may be jeopardized if, for example, some flows are counted twice. Such a situation may occur if, for example, two flow capture devices report the same flow to the flow collector (e.g., as a result of packet routing behavior or other normal network operation). As mentioned above, the flow capture device may summarize the raw packet information into a flow or may export the raw packet information to a central location, such as a flow controller, where it may be summarized into a flow. As mentioned above, a flow capture device may be a separate device or may be included as a part of a router or switch.

To prevent such double counting from skewing the results of flow capture, a hash function may be performed using at least a portion of the first packet in a flow to obtain a hash value and this has value may be sent to the flow controller. In one embodiment this hash value may be transmitted along with its corresponding flow information. The flow controller may compare the received hash with other received hashes. If a match is found, the flow controller may ignore the flow corresponding to the received hash.

Depending on the deployment scheme, some flows may be double counted. For example, referring to FIG. 2, traffic between subnet 201 and subnet 203 may be captured by both flow capture device 207 and flow capture device 209. However, when flow capture devices 207 and 209 export flows to flow controller 213, the same flow may be counted as two separate flows by flow controller 213. Counting this flow twice may undesirably alter the signatures of the destination and source hosts of this flow.

Figure 9:
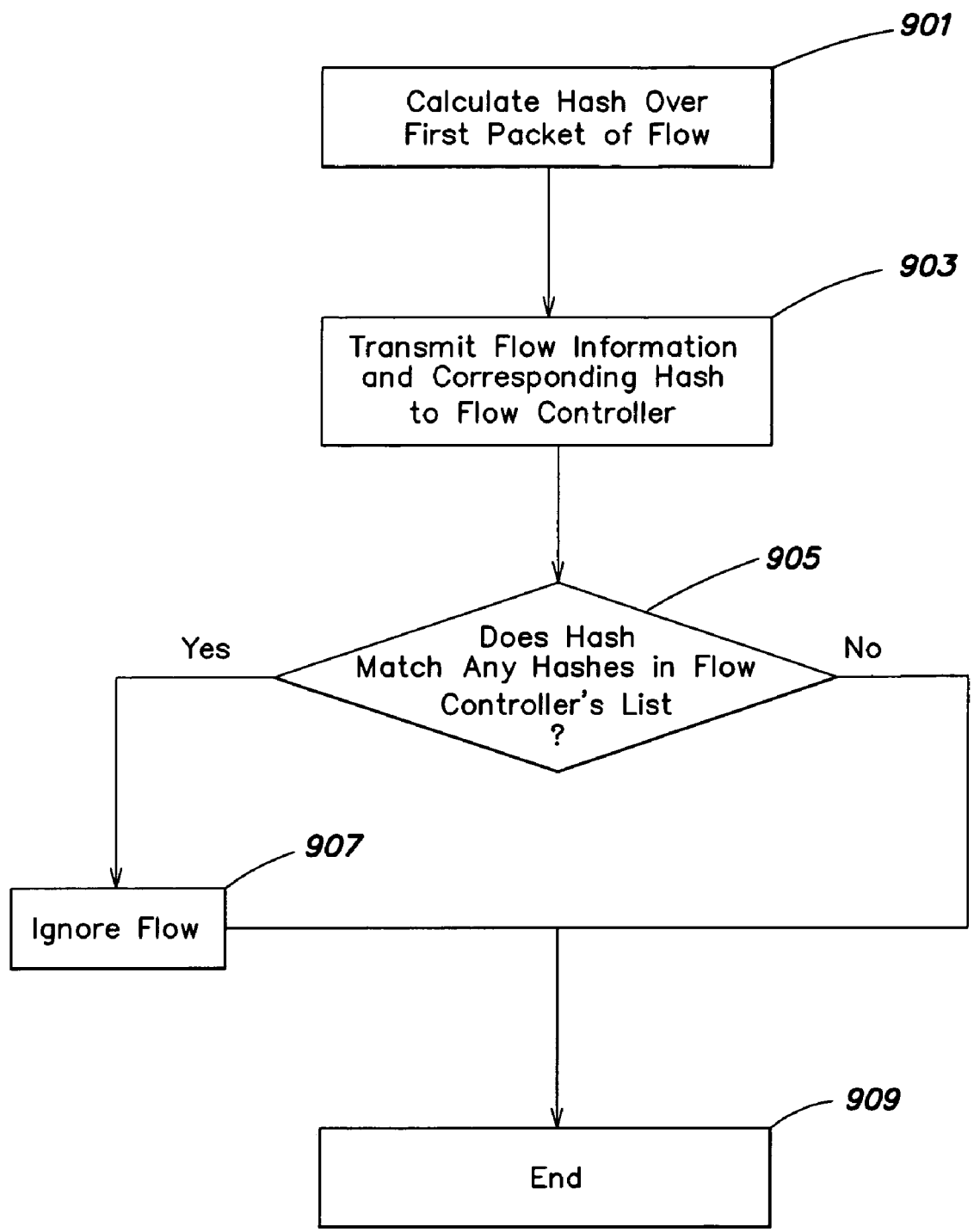
FIG. 9 is a flow chart for avoiding the double counting of flows according to one embodiment of the invention.

FIG. 9 illustrates a method for solving this double counting problem. At step 901, a hash is calculated over the first packet in the flow. In one embodiment, the hash may be calculated based on the full transport protocol packet header and the full IP header except for the time to live (ttl) and checksum values. Because the ttl can be different at different points in the network (e.g., flow capture device 207 and flow capture device 209) and because the checksum varies with the ttl, this information is excluded from the hash.

It should be understood that these values are given only as an example of a way in which a hash for a flow could be computed. Many other ways for computing a hash will occur readily to one of ordinary skill in the art and are intended to be within the spirit and scope of the invention. For example, the hash may be calculated using additional information in the first packet or the same information in the first two packets. Further, the invention need not be limited to a hash algorithm. Any method for determining whether the same two flows are being observed may be used.

It should further be appreciated that hash may be computed at the flow capture device or at the flow controller. If the hash is computed at the flow capture device, then it is transmitted at step 903 along with the flow information to the flow controller. If the hash is computed at the flow controller, the flow information is first transmitted from the flow capture device and the hash is computed after the flow information has been received by the flow controller. The flow controller maintains a list of hashes corresponding to received flows. The list may be maintained, for example, in a least-recently-used fashion. That is, the hashes which correspond to flows which are the least recent to be received or updated are at the top of the list. It should be appreciated that the list may be maintained in any manner as the invention is not limited in this respect. For example, the list may be maintained in a most-recently-used order, random order, or any other order.

At step 905, a received hash is compared to the other hashes in the flow controller's list. If a match is found then the flow corresponding to the received hash is ignored (step 907). Otherwise the hash is added to the flow controller's list and the process ends at step 909.

Grouping of Entities

As mentioned above, signatures may used to create groups of hosts based on the similarity of the signatures (i.e., the similarity of network behavior, similarity of host attributes, similarity of authentication attributes, or similarity of other system behavior). Grouping hosts may be useful in creating network policy for a host because network policy may be determined at a group level and thus does not to be created on a host by host basis.

Signatures may be collected silently over a period of time. A host's signatures define its network behavior and can be used as a network policy for that host. That is, the host's signatures define a baseline of network behavior for that host. Any behavior that deviates from the baseline is a violation of the policy and may result in an alert being sent to a network administrator. Further, once signatures for the hosts in the network have been collected, a network administrator can view the signatures for that host and remove any signatures which they do not wish to be part of the policy for that host. As a result, the network administrator does not have to create a network policy from scratch. Instead, a policy may be automatically created and the administrator may simply edit it. However, if the enterprise includes a large number of hosts, editing the policy for each host can still be very time consuming. Thus, in one embodiment of the invention, hosts with similar signatures are grouped together. The signatures for the group define the network policy for the group. The administrator can then view a list of host signatures or group signatures and edit them based on the desired network policy. By editing policy at the group level, the administrator can avoid having to edit the policy for each individual host in the network.

According to one embodiment of the invention, grouping of entities is accomplished by forming hierarchical clusters of entities based on the similarity between the entities. Clusters at a particular level in the hierarchy may be selected as groups. The level in the hierarchy at which to select clusters may be based on a desired degree of similarity between entities in a group. It should be appreciated that the term entities, as used herein, is not limited to hosts or other network devices. Likewise, the term similarity is not limited to similarity of network behavior. Indeed, an entity may be any type of objects (physical or not) and similarity may refer to any characteristic or combination of characteristics of the objects. For example, objects may be grouped according to color, shape, size, or a combination thereof. Any type of entities may be used and grouped according to similarities between any particular characteristics of those entities, as the invention is not limited in this respect.

In one embodiment of the invention, a system and method for grouping entities based on the similarity of the entities is provided. It should be appreciated that in the context of determining network policy, an entity refers to a host or other network device. However, the system and method described herein is equally applicable to grouping other entities that may be unrelated to computer networks. For example, objects may be grouped according to their color, shape or size. Indeed, any characteristic of any entity may be used in determining similarity. In the context of an enterprise computer network, hosts are grouped based on the similarity of their network behavior.

Figure 10:
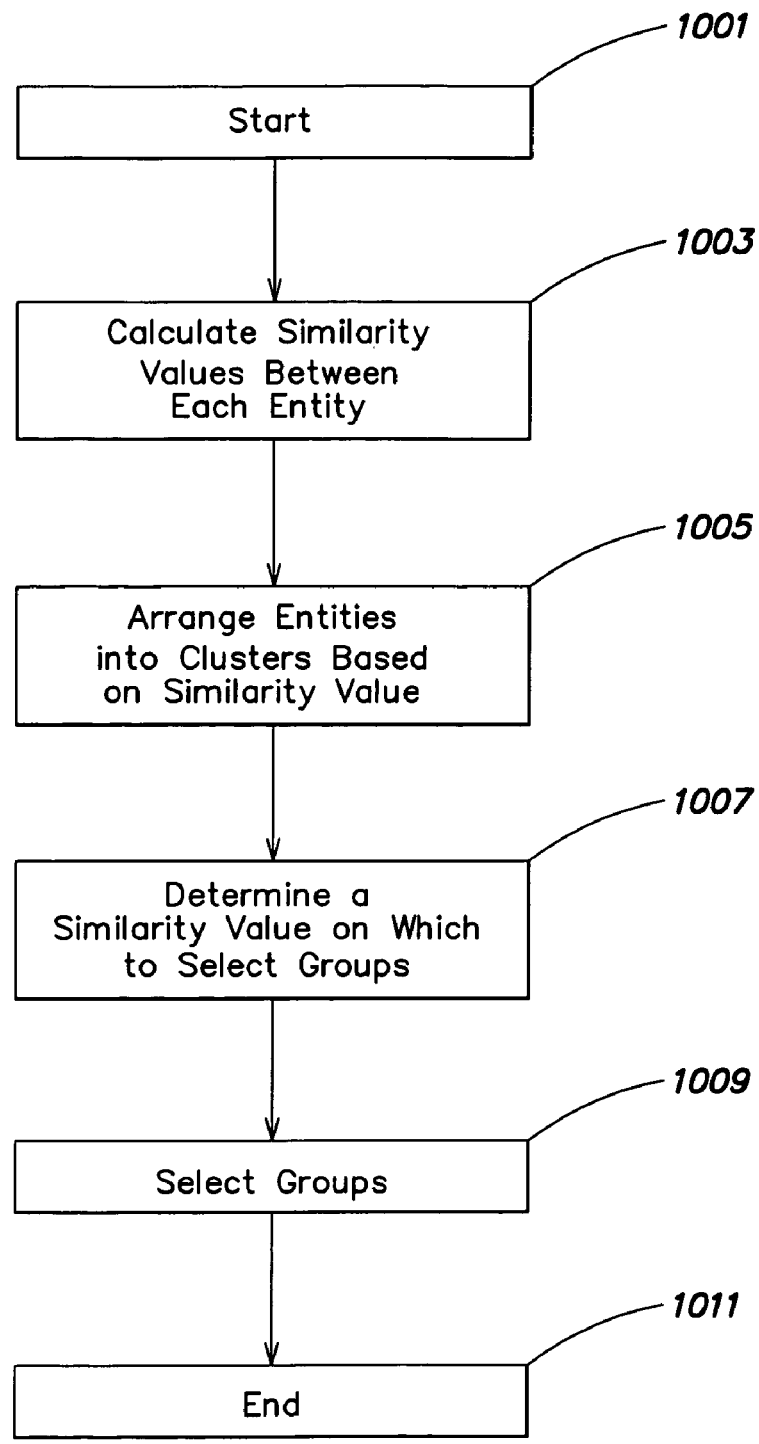
FIG. 10 is a flow chart illustrating a process for grouping entities according to one embodiment of the invention.
Figure 11:
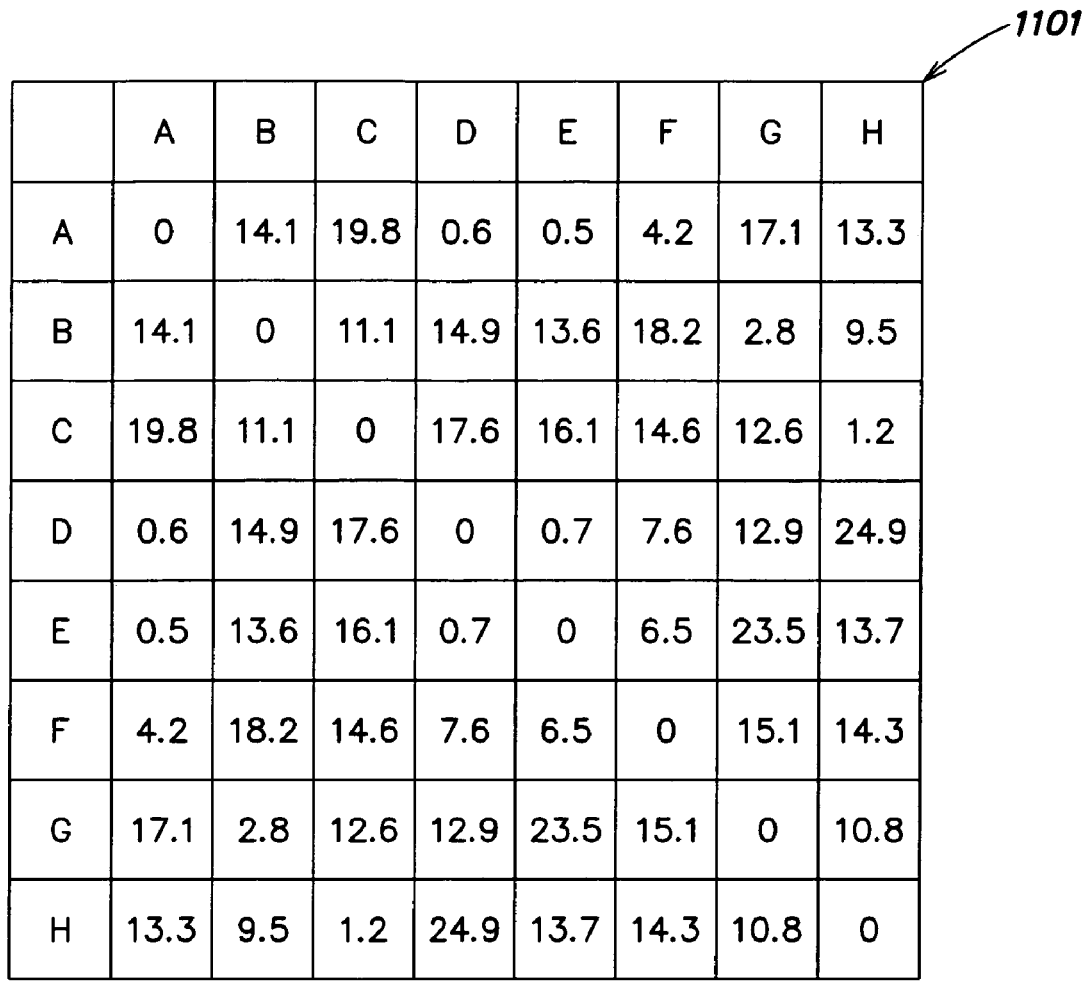
FIG. 11 is a matrix illustrating the similarity values between entities according to one embodiment of the invention.

FIG. 10 illustrates a process by which entities may be grouped. At step 1001, the process begins. At step 1003, a value representing the similarity between each two entities being grouped is calculated. FIG. 11 shows an example of the degree of similarity between eight entities. In FIG. 11, matrix 1101 gives a value for each pair of entities. The value represents the degree of similarity between the entities. In this example, as the value increases the similarity between the entity decreases. Thus, the similarity between entity A and entity C is represented by the value 19.9, while the similarity between entity A and entity E is represented by the value 0.2. These values indicate that entity A is more similar to entity E than it is to entity C. As can been seen, a value is given for every pair of entities.

It should be understood that a method of determining such values will vary depending on the type of entities being grouped. Many methods for determining similarity values for a particular type of entities may exist. A process for determining similarity between hosts in the network based on network behavior will be described in detail below.

Referring back to FIG. 10, once the similarity values between each entity have been determined, at step 1005 the entities are arranged into hierarchical clusters based on the similarity values. A hierarchical clustering according to one embodiment is an iterative process wherein smaller clusters are merged into larger cluster until one cluster includes all entities are subsumed by a single cluster. The process starts with each entity in a separate cluster. Then, the two clusters that are most similar (based on the similarity values computed in step 1003) are merged into a single cluster. This process is repeated until all entities are in a single cluster. Computing the similarity between two clusters involves examining the similarity between individual nodes in each cluster. The similarity between two clusters is the similarity between the two entities most dissimilar from each other (i.e., having the greatest similarity value).

Hierarchical Clustering

Figure 12A:
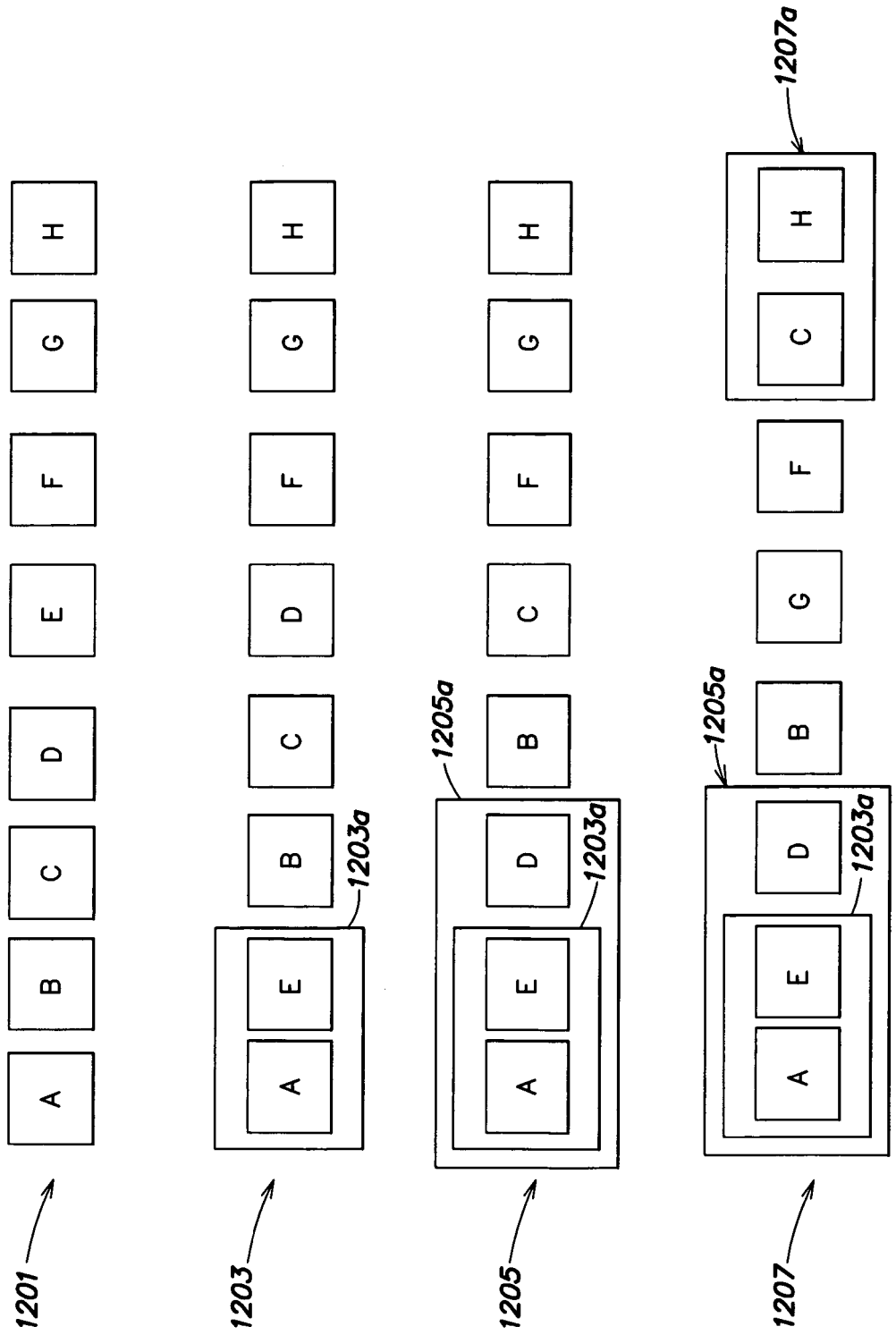
FIGS. 12A and 12B are diagrams illustrating hierarchical clustering of entities based on the similarity values of FIG. 11 according to one embodiment of the invention.
Figure 12B:
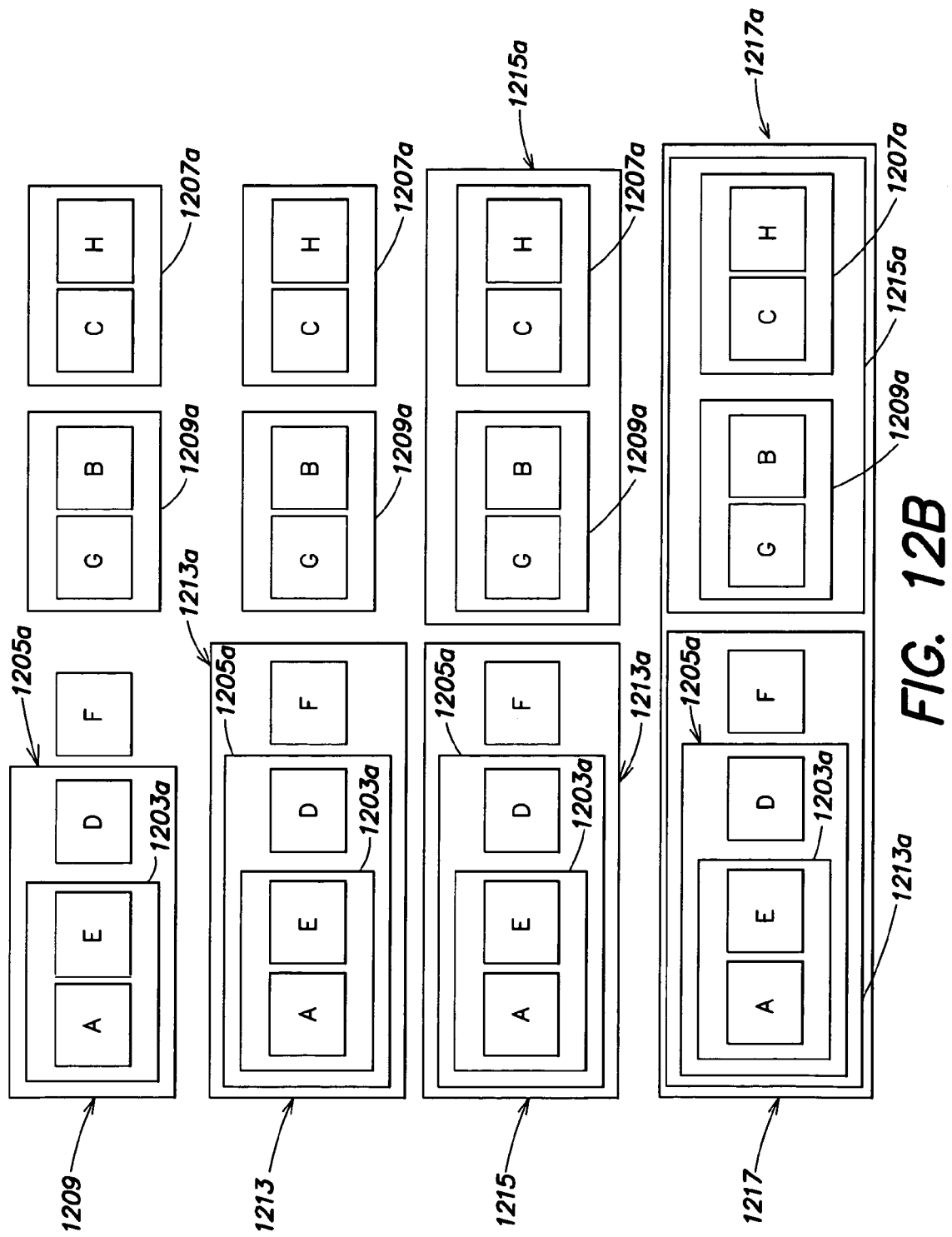

Continuing in the example of FIG. 11, FIGS. 12A and 12B illustrate a hierarchical clustering process according to one embodiment of the invention. Initially, at step 1201, each entity is in a separate cluster. At step 1203, the two most similar clusters are entity A and entity E, having a similarity value of 0.5. Thus, these two entities are formed into a cluster 1203a. At step 1205, the next two most similar clusters are cluster 1203a and entity D, having a similarity value of 0.7 (i.e., the similarity value between entity E and entity D). Thus, these two clusters are merged forming cluster 1205a. At step 1207, the next two most similar clusters are entity C and entity H, having a similarity value of 1.2. Thus, these two entities are merged into a single cluster, 1207a. At step 1209, in FIG. 12B, the next two most similar clusters are entity B and entity G having a similarity value of 2.8. Accordingly, these two clusters are merged into a single cluster 1209a. At step 1213, the next two most similar clusters are cluster 1205a and entity F, having a similarity value of 7.6 (i.e., the similarity value between entity D and entity F). Accordingly, these two clusters are merged into cluster 1213a. At step 1215, the next two most similar clusters are cluster 1209a and 1207a, having a similarity value of 12.6 (i.e., the similarity value between entity G and entity C). Finally, at step 1217, cluster 1213a and 1215a, having a similarity value of 24.9, are merged into cluster 1217a. Now, all entities are in a single cluster and the process ends.

Referring to FIG. 10, at step 1007, a degree of similarity on which to group may be determined. That is, once the entities have been arranged into clusters, some of the clusters may be selected as groups. However, as the number of clusters decreases, so does the degree of similarity between entities in that cluster. For example, at step 1201 there are eight clusters. Since each cluster includes only a single entity, the entities within each cluster are very similar (in this case, identical). However, at step 1217 there is only a single cluster, 1217a which includes eight entities. Thus, some of the entities within cluster 1217a may be very dissimilar. Based on a desired degree of similarity between entities in a group, the clusters at a corresponding level of the hierarchy may be selected as the groups. For example, if it is desired that entities in a group be very similar, then one might select clusters at a low level in the hierarchy (e.g., step 1201 or step 1203) as groups. Alternatively, if it is desired that some entities in a group be somewhat dissimilar, clusters at a high level in the hierarchy (e.g., step 1215 or step 1217) may be selected as groups.

Figure 13:
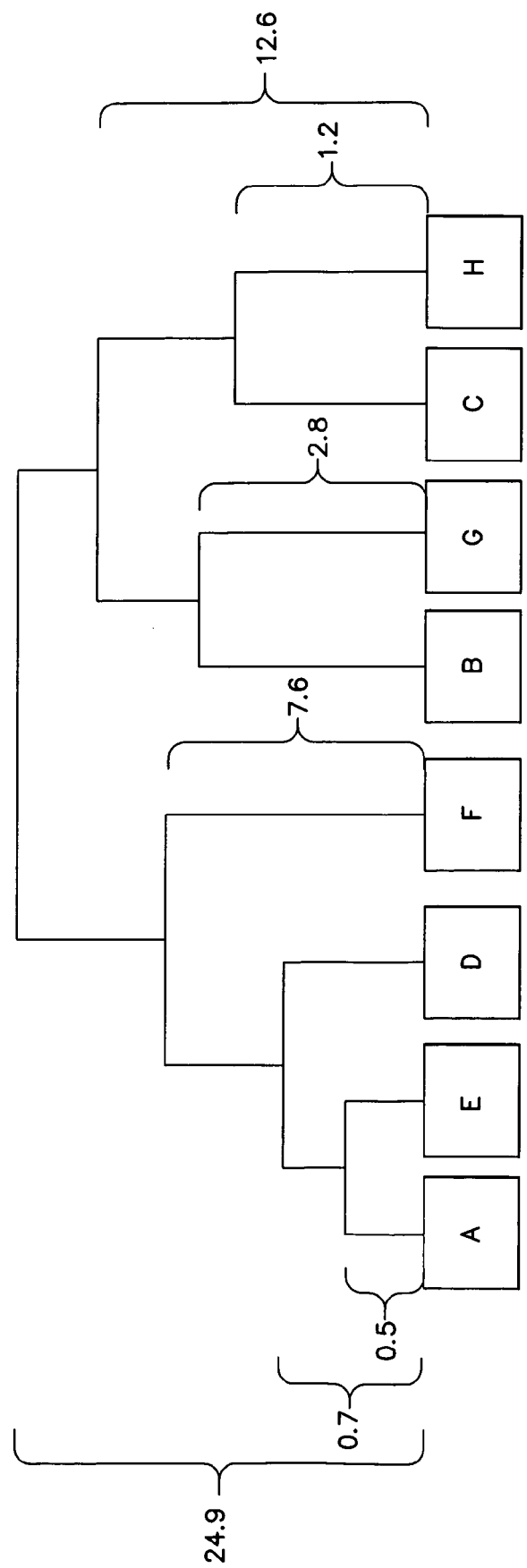
FIG. 13 is a diagram illustrating a selection of groups based on the hierarchical clustering of FIGS. 12A and 12B according to one embodiment of the invention.
Figure 14:
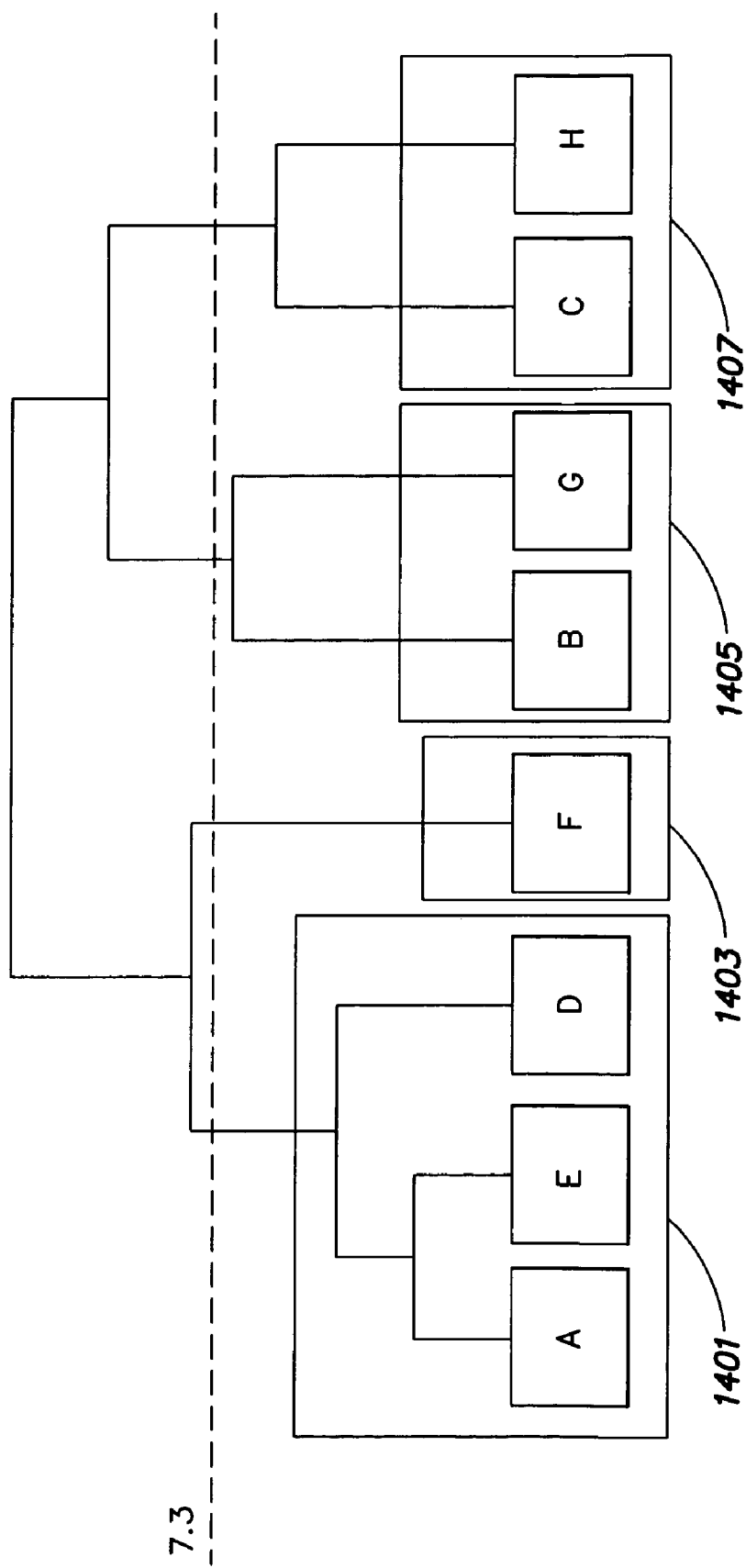
FIG. 14 is a diagram illustrating a selection of groups based on the hierarchical clustering of FIGS. 12A and 12B according to one embodiment of the invention.
Figure 15:
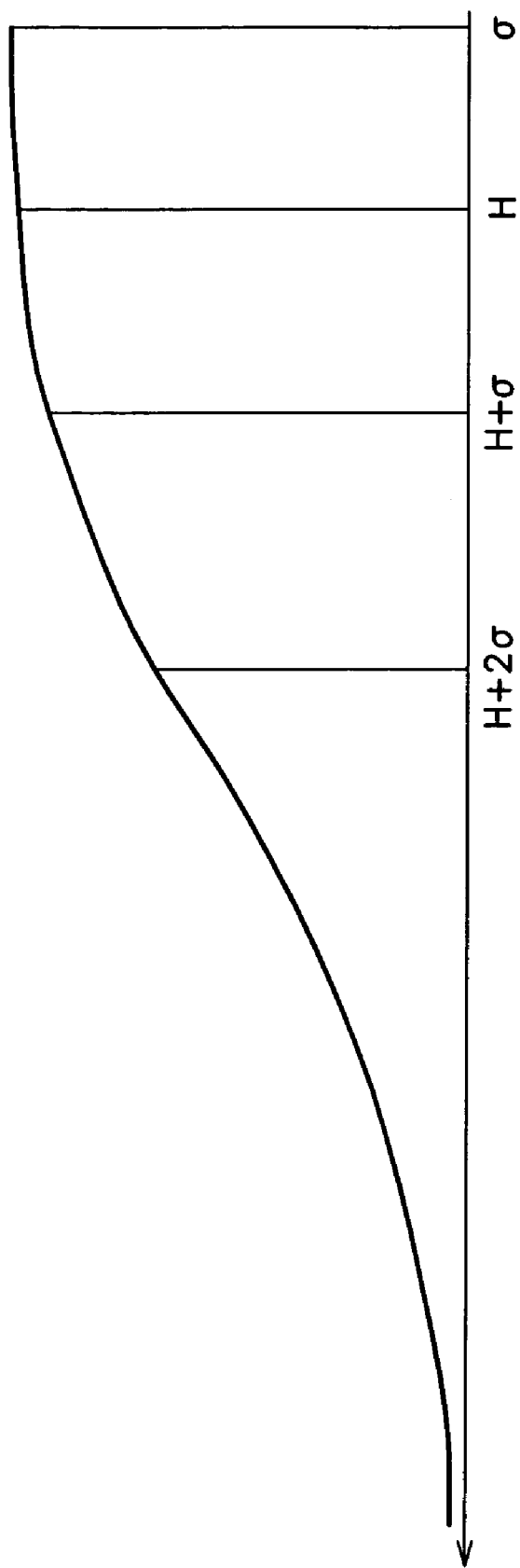
FIG. 15 is a graph illustrating an example of a distribution of similarity values in a hierarchical clustering according to one embodiment of the invention.

An example process of selecting a degree of similarity to group on is described below with reference to FIGS. 13-15. In FIG. 13, the entities are arranged into a binary tree based on the hierarchical clusters of FIGS. 12A and 12B. The height of the lines connecting any two entities or any two clusters is the degree of similarity between those entities clusters. For example, as shown in FIG. 13, the height of the line connecting entity A and entity E is 0.5, while the height of the line connecting entity D and the cluster which includes entity A and entity E is 0.7.

The tree may b e divided at a given height. For example, as shown in FIG. 14, a line is drawn through the tree at height 7.3. If any subtree has a vertex height greater than the height of the division (7.3 in this example), then the two clusters that created that subtree are split into distinct groups. For example, in FIG. 14, the subtree connecting clusters 1401 and 1403 has a height of 7.6. Therefore, clusters 1401 and 1403 are distinct groups. Likewise, the subtree connecting 1405 and 1407 has a height of 12.6, thus clusters 1405 and 1407 are distinct groups.

The height at which to divide the tree may be determined as follows. Typically, the similarity values of the clusters in the tree will yield a Gaussian distribution, as shown in FIG. 15. First, the mean of the mean of this distribution is calculated. Then, the standard deviation of the distribution is calculated. The height may be calculated using the formula of Table 1.

TABLE 1

$$h = \mu + p\sigma$$

h = height at which to divide the tree
p = user selected scaling parameter
μ = mean of similarity values in tree
σ = standard deviation of similarity values in tree As shown in Table 1, the height at which to divide the tree is the mean of the similarity values in the tree plus a number of standard deviations away from the mean. The number of standard deviations, represented by the variable p, is selectable by a user. As can be seen from the distribution of FIG. 15, as the value of p increases, the similarity of entities in a group decreases. Also, as the value of p increases, the number of total groups decreases. If a smaller number of groups with more dissimilar entities is desired, then a higher value p may be selected. Consequently, if a large number of groups with very similar entities is desired, then a low value of p can be chosen. Referring back to FIG. 10, at step 1009, groups may be selected based on the value of h. At step 1011 the process ends.

It should be appreciated that the above-described process for grouping entities is one of many ways of grouping entities. In the context of an enterprise network, many other methods of grouping hosts could be used and the invention is not limited to the above described process. For example, hosts could be grouped using the mean of all of a host's similarity values. Fixed ranges of average similarity values could be used to define the groups. That is, for example, the average similarity values of group 1 may range from 0-5 while the average similarity values of group 2 may range from 0-10. If a host's average similarity value falls between 0 and 5 it is placed in group 1, while if it falls between 5-10 it is placed in group 2. Many other methods of grouping hosts will occur to one of ordinary skill in the art and are intended to be within the spirit and scope of the invention.

E. Determining Similarity Between Hosts

As discussed above, the entities that are grouped in this manner may be hosts in an enterprise network. In a further embodiment of the invention, similarity between hosts is determined based on the network behavior of the hosts and the hosts may be grouped based on the similarity of their network behavior. As discussed above, when grouping hosts in this manner, a similarity value is used. One method of calculating a similarity value between two hosts which defines similarity of the hosts' network behavior uses the signatures of the host generated by the flow capture devices and flow controller.

Figure 16:
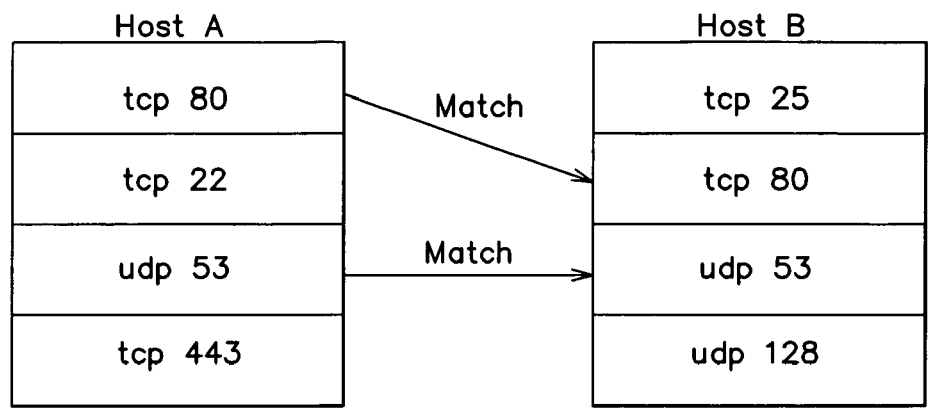
FIG. 16 is an example of input vectors of two hosts according to one embodiment of the invention.

In this method, a input vector is created for each of the two hosts based on the top services used by each host. For example, as shown in FIG. 16, the input vector of host A includes tcp port 80, tcp port 22, udp port 53, and udp port 443. The input vector of host B includes tcp port 25, tcp port 80, udp port 53, and udp port 128.

In the example of FIG. 16, four services are listed in each host's input vector. That is, the top four services of each host are placed in the input vector. However, it should be appreciated that the input vector of a host may contain any number of services, such as three, five, six, seven, or more.

For each service in the input vector of each host, a total byte count is stored along with the number of other hosts in the network that this host used this service with which to communicate. Any services that two hosts' input vectors have in common is considered a match. Thus, in FIG. 16 there are two matches (i.e., tcp port 80 and udp port 53). A vector score is determined by subtracting the total number of matches from the total number of possible matches. In the example of FIG. 16, there are 4 possible matches and two matches. Consequently, the vector score is two. For each match, the byte counts (i.e., the total number of bytes that used this service) for each host is compared. That is, a byte differential between the two hosts may be computed for each matched service. Table 2 shows a formula for computing the byte differential for a service between host A and host B.

TABLE 2

$$\text{byte\_diff}(A, B) = \frac{\text{bytes}_A - \text{bytes}_B}{\text{bytes}_A + \text{bytes}_B}$$

$\text{bytes}_A$ = total number of bytes entering and leaving host A using the service
$\text{bytes}_B$ = total number of bytes entering and leaving host B using the service Byte differentials for each service may be summed to create a total byte differential. As shown in Table 3, the total byte differential is added to the vector score to create a match score for the two hosts.

TABLE 3 match_score(A,B) = (possible_matches − num_matches) + total_byte_diff(A,B)

Once the match score is determined, the total traffic in and out of each of the two hosts is considered for all services, not just the top services in the hosts' input vectors. First, for each of the two hosts, a value that compares the number of bytes of network traffic entering the host compared to the number of bytes of network traffic exiting the host. Table 4 is a formula for computing the directionality of the traffic for a host.

TABLE 4

$$d = \log\left(\frac{\text{bytes\_in} + 1}{\text{bytes\_out} + 1}\right)$$

Next the magnitude of the total traffic for each of the two hosts is computed. That is, instead of looking at a ratio if incoming traffic to outgoing traffic, as in the directionality, the magnitude considers the total amount of traffic of the host. Table 5 shows a formula for computing the magnitude of the traffic for a host.

TABLE 5

$$m = \log(\text{bytes\_in} + \text{bytes\_out} + 1)$$

Figure 17:
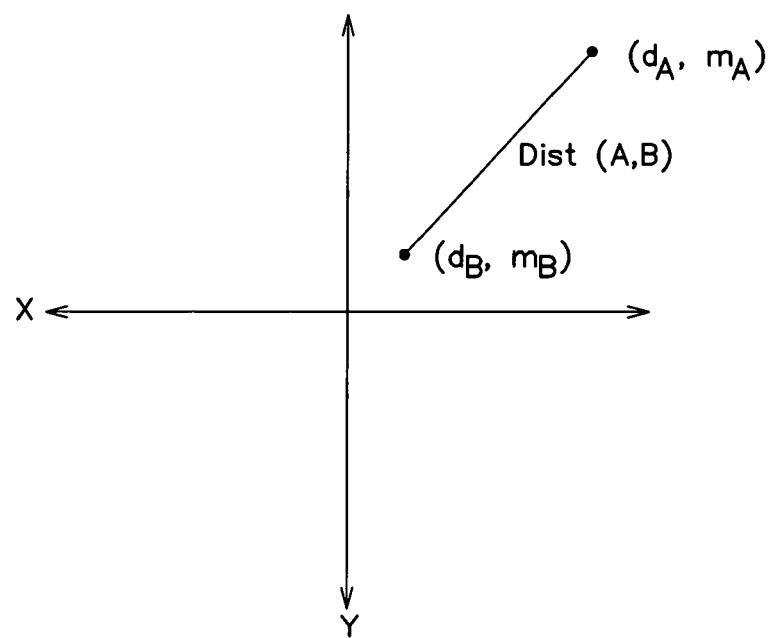
FIG. 17 is a Cartesian plane illustrating the distance between to hosts according to one embodiment of the invention.

As shown in FIG. 17, the total traffic of a host can be thought of as a point on a Cartesian plane, where the directionality of the host's traffic, d, represents the x-coordinate and the magnitude of the host's traffic, m, represents the y-coordinate. Thus, as shown in FIG. 17, the value ($d_A$, $m_A$) represents the position of host A on the plane and the value ($d_B$, $m_B$) represents the position of host B on the plane. The similarity of the total network traffic of host A and host B can be thought of as the Euclidean distance between the two points on the plane. This distance may be calculated using the formula shown in Table 6.

TABLE 6

$$\text{dist}(A,B) = \sqrt{(d_A - d_B)^2 + (m_A - m_B)^2}$$

$d_A$ = directionality of total traffic of Host A
$d_B$ = directionality of total traffic of Host B
$m_A$ = magnitude of total traffic of Host A
$m_B$ = magnitude of total traffic of Host B The total similarity value between host A and host B takes into account both the similarity between the two hosts' total traffic (i.e., the distance) and the similarity between the two hosts' common traffic (i.e., the match score). Table 7 shows a formula for computing the total similarity value.

TABLE 7 similarity_value(A,B) = dist(A,B) + match_score(A,B)

The similarity value thus defines the similarity of the two hosts' network behavior and may be used in the hierarchical clustering algorithm described above. However, it should be appreciated that many other algorithms for defining similarity between hosts based on network behavior may be used. For example, neural net classification algorithms, such as unsupervised self-organization algorithms may be used to determine similarity between hosts. Many other algorithms for defining similarity between hosts based on network behavior or other criteria may occur to those skilled in the art and are intended to be within the spirit and scope of the invention.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of determining a similarity between a first host and a second host based on the network behavior of the first and second hosts comprising acts of:
   a) determining a first score based on the similarity between network traffic of top services using the first host and network traffic of top services using the second host;
   b) determining a second score based on a total network traffic of the first host and a total network traffic of the second host;
   c) combining the first and second scores to generate a similarity value, wherein the act b) further comprises an act of determining the second score based on a directionality and a magnitude of the total traffic of the first and second hosts, and wherein the method further comprises:
   b1) representing the first host as a first point on a Cartesian plane based on the directionality and magnitude of the total traffic of the first host;
   b2) representing the second host as a second point on a Cartesian plane based on the directionality and magnitude of the total traffic of the second host;
   b3) computing a Euclidean distance between the first and second points; and
   b4) combining the Euclidean distance and the first score to generate the similarity value.

2. The method of claim 1, wherein the act a) further comprises an act of:
   determining the first score based on the similarity between network traffic of a top four of the top services using the first host and network traffic of a top four of the top services using the second host.

3. A system configured to determine similarity between a first host and a second host based on network behavior of the first and second hosts comprising:
   a) means for determining a first score based on the similarity between network traffic of top services using the first host and network traffic of top services using the second host; and
   b) means for determining a second score based on a total network traffic of the first host and a total network traffic of the second host;
   c) means for combining the first and second scores to generate a similarity value, wherein the means for the determining the second score further comprises means for determining the second score based on a directionality and a magnitude of the total traffic of the first and second hosts, and wherein the system further comprises:
   b1) means for representing the first host as a first point on a Cartesian plane based on the directionality and magnitude of the total traffic of the first host;
   b2) means for representing the second host as a second point on a Cartesian plane based on the directionality and magnitude of the total traffic of the second host;
   b3) means for computing a Euclidean distance between the first and second points; and
   b4) means for combining the Euclidean distance and the first score to generate the similarity value.

4. The system of claim 3, wherein the means for determining a first score further comprises:
   means for determining the first score based on the similarity between network traffic of a top four of the top services using the first host and network traffic of a top four of the top services using the second host.

5. A computer-readable medium having computer-readable signals stored thereon that define instructions that, as a result of being executed by a computer, instruct the computer to perform a method of determining similarity between a first host and a second host based on the network behavior of the first and second hosts comprising acts of:
- a) determining a first score based on the similarity between network traffic of top services using the first host and network traffic of top services using the second host;
- b) determining a second score based on a total network traffic of the first host and a total network traffic of the second host;
- c) combining the first and second scores to generate a similarity value, wherein the act b) further comprises an act of determining the second score based on a directionality and a magnitude of the total traffic of the first and second hosts, and therein the method further comprises:
  - b1) representing the first host as a first point on a Cartesian plane based on the directionality and magnitude of the total traffic of the first host;
  - b2) representing the second host as a second point on a Cartesian plane based on the directionality and magnitude of the total traffic of the second host;
  - b3) computing a Euclidean distance between the first and second points; and
  - b4) combining the Euclidean distance and the first score to generate the similarity value.

6. The computer-readable medium of claim 5, wherein the act a) further comprises an act of:

determining the first score based on the similarity between network traffic of a top four of the top services using the first host and network traffic of a top four of the top services using the second host.

* * * * *